United States Patent
Schlimgen et al.

(10) Patent No.: US 11,641,805 B2
(45) Date of Patent: May 9, 2023

(54) CONVERTIBLE DUAL-SIDED AUGER SYSTEM FOR A FARM IMPLEMENT

(71) Applicant: Unverferth Manufacturing Co., Inc., Kalida, OH (US)

(72) Inventors: Ronald J. Schlimgen, Shell Rock, IA (US); Michael D. Van Mill, Shell Rock, IA (US)

(73) Assignee: Unverferth Manufacturing Co., Inc, Kalida, OH (US)

( * ) Notice: Subject to any disclaimer, the term of this patent is extended or adjusted under 35 U.S.C. 154(b) by 0 days.

(21) Appl. No.: 17/236,072

(22) Filed: Apr. 21, 2021

(65) Prior Publication Data
US 2021/0235623 A1    Aug. 5, 2021

Related U.S. Application Data

(63) Continuation of application No. 16/412,896, filed on May 15, 2019, now Pat. No. 11,019,771.

(51) Int. Cl.
*A01D 90/10* (2006.01)
*B60P 1/42* (2006.01)
(Continued)

(52) U.S. Cl.
CPC ......... *A01D 90/10* (2013.01); *A01D 41/1217* (2013.01); *B60P 1/42* (2013.01); *B60P 1/48* (2013.01); *B65G 67/24* (2013.01)

(58) Field of Classification Search
CPC ....... A01D 90/10; A01D 41/1217; B60P 1/42; B60P 1/48; B65G 67/24
See application file for complete search history.

(56) References Cited

U.S. PATENT DOCUMENTS 2,438,301 A    3/1948  Schulte
2,960,320 A   11/1960  Heider
(Continued)

OTHER PUBLICATIONS

"2018 Elmers Haul Master 2000 for sale in Rosenort, Manitoba Canada," Rosenort Motors Ltd., https://www.tractorhouse.com/listings/farm-equipment/for-sale/29651333/2018-elmers-haul-master-2000?print=1, 2018, 1 page.
(Continued)

*Primary Examiner* — Glenn F Myers
(74) *Attorney, Agent, or Firm* — Rothwell, Figg, Ernst & Manbeck, P.C.

(57) ABSTRACT

A farm implement includes a frame, a container mounted on the frame, an intake housing rotatably connected to a front wall of the container proximate to a discharge opening, a first auger assembly, and a second auger assembly. The first auger assembly is disposed in the container and conveys agricultural material through the discharge opening. The second auger assembly is rotatably connected to an outlet of the intake housing and includes an inlet that receives agricultural material from the intake housing and an outlet that discharges agricultural material. The farm implement further includes a first mounting assembly and a second mounting assembly disposed along the front wall. The second auger assembly is mounted on one of the first and second mounting assemblies at an operating position, without being mounted to the other one of the first and second mounting assemblies.

31 Claims, 31 Drawing Sheets

(51) Int. Cl.
*B65G 67/24* (2006.01)
*A01D 41/12* (2006.01)
*B60P 1/48* (2006.01)

(56) References Cited

U.S. PATENT DOCUMENTS

| | | | |
|---|---|---|---|
| 3,098,555 | A | 7/1963 | Harriott |
| 3,717,272 | A | 2/1973 | Chartier et al. |
| 4,411,581 | A | 10/1983 | Niewold |
| 5,468,113 | A | 11/1995 | Davis |
| 9,457,850 | B2 * | 10/2016 | Van Mill .............. B62D 55/065 |
| 10,071,669 | B2 | 9/2018 | Kinzenbaw |
| 10,160,367 | B2 | 12/2018 | Van Mill |
| 2011/0164952 | A1 | 7/2011 | Hollenberg |
| 2017/0055454 | A1 | 3/2017 | Michael et al. |
| 2018/0242521 | A1 | 8/2018 | Thomson et al. |
| 2018/0244477 | A1 | 8/2018 | Stilborn et al. |
| 2019/0000016 | A1 | 1/2019 | Friesen |

OTHER PUBLICATIONS

"2018 Elmers Haul Master 1300 for sale in Barnard, South Dakota," Ellwein Equipment, https://www.tractorhouse.com/listings/farm-equipment/for-sale/27653735/2018-elmers-haul-mast . . . , 2018, 1 page.
"Right-hand grain cart auger," Elmer's Manufacturing, https://elmersmfg.com/2017/12/right-hand-grain-cart-auger/, 2017, 4 page.
"1122 and 1322 grain carts," DEMCO, 2019 Harvest Equipment Specifications, 1 page.
"Grain carts 1122, 1322," demco-products.com, 2019, pp. 16-17.
"What makes the haulmaster grain cart great?" Elmer's Manufacturing, https://elmersmfg.com/haul-master-grain-cart/, 2019, 16 pages.

* cited by examiner

CONVERTIBLE DUAL-SIDED AUGER SYSTEM FOR A FARM IMPLEMENT

CROSS REFERENCE TO RELATED APPLICATION(S)

This application is a Continuation of U.S. application Ser. No. 16/412,896, filed May 15, 2019. The entirety of the disclosure of the above-referenced application is incorporated herein by reference.

FIELD OF THE DISCLOSURE

This disclosure relates generally to farm implements, and more particular, to grain carts capable of unloading from more than one side.

BACKGROUND

Carts, such as grain carts, can be used to shorten harvesting time by improving the efficiency of harvesting equipment such as combines. Such carts can, for example, be used to transport grain from harvesters or combines in the field to grain trucks or bins at the side of the field. Carts can be used to enable a combine to continue to harvest while unloading the grain into the cart. This grain unloading arrangement can increase productivity dramatically because combines typically do not stop to unload grain. In addition, when reaching full capacity, combines themselves typically do not need to travel to grain trucks or bins at the side of the field. After a cart is loaded with grain or other material by one or more combines, the grain is unloaded from the cart into a bin for temporary storage or into a waiting grain truck for transport to another location, such as a grain elevator.

Carts capable of unloading grain directly into a grain truck or bin often use a conveyor to do so. Often the conveyor is in the form of an auger. Various auger configurations are known. Auger structures can, for example, be contained inside the hopper, located entirely outside of the hopper, or positioned in another desired location. Auger configurations can, for example, have a single auger or multiple augers. The auger structure can, for example, be located at the front, side, back, corner, or another desired location of the cart.

Typically, the vertical auger of a grain cart has been limited to discharging grain on one side of the grain cart. In such a situation, an operator is limited during an unloading operation because the grain held in the cart must unload from the predetermined unloading side of the grain cart where the vertical auger is located. Consequently, when a truck or storage bin is adjacent to a non-unloading side of the grain cart, the operator may have to turn the grain cart around or maneuver the truck or bin from the non-unloading side of grain cart to the unloading side of the grain cart. However, maneuvering the grain cart, the truck, or storage bin is cumbersome to the operator and prolongs the unloading process of the grain cart.

In addition, some tractors towing grain carts may include auger controls disposed on one side of the operator, opposite to the unloading side of the grain cart, or seats that rotate toward a direction opposite to the unloading side of the grain cart, thereby limiting the operator's visibility of the grain cart auger during operation.

SUMMARY

Accordingly, there is a need to provide improved grain carts (e.g., single auger type or dual auger type grain carts) that allow grain to be discharged from either side (e.g., right-hand or left-hand sides) of the grain cart.

According to a first aspect, embodiments of a farm implement are provided. In some embodiments, the farm implement may include [TO BE DETERMINED AFTER CLAIMS FINALIZED]

Other features and characteristics of the subject matter of this disclosure, as well as the methods of operation, functions of related elements of structure and the combination of parts, and economies of manufacture, will become more apparent upon consideration of the following description and the appended claims with reference to the accompanying drawings, all of which form a part of this specification, wherein like reference numerals designate corresponding parts in the various figures.

BRIEF DESCRIPTION OF THE DRAWINGS

The accompanying drawings, which are incorporated herein and form part of the specification, illustrate various embodiments of the subject matter of this disclosure. In the drawings, like reference numbers indicate identical or functionally similar elements.

DETAILED DESCRIPTION

Figure 1:
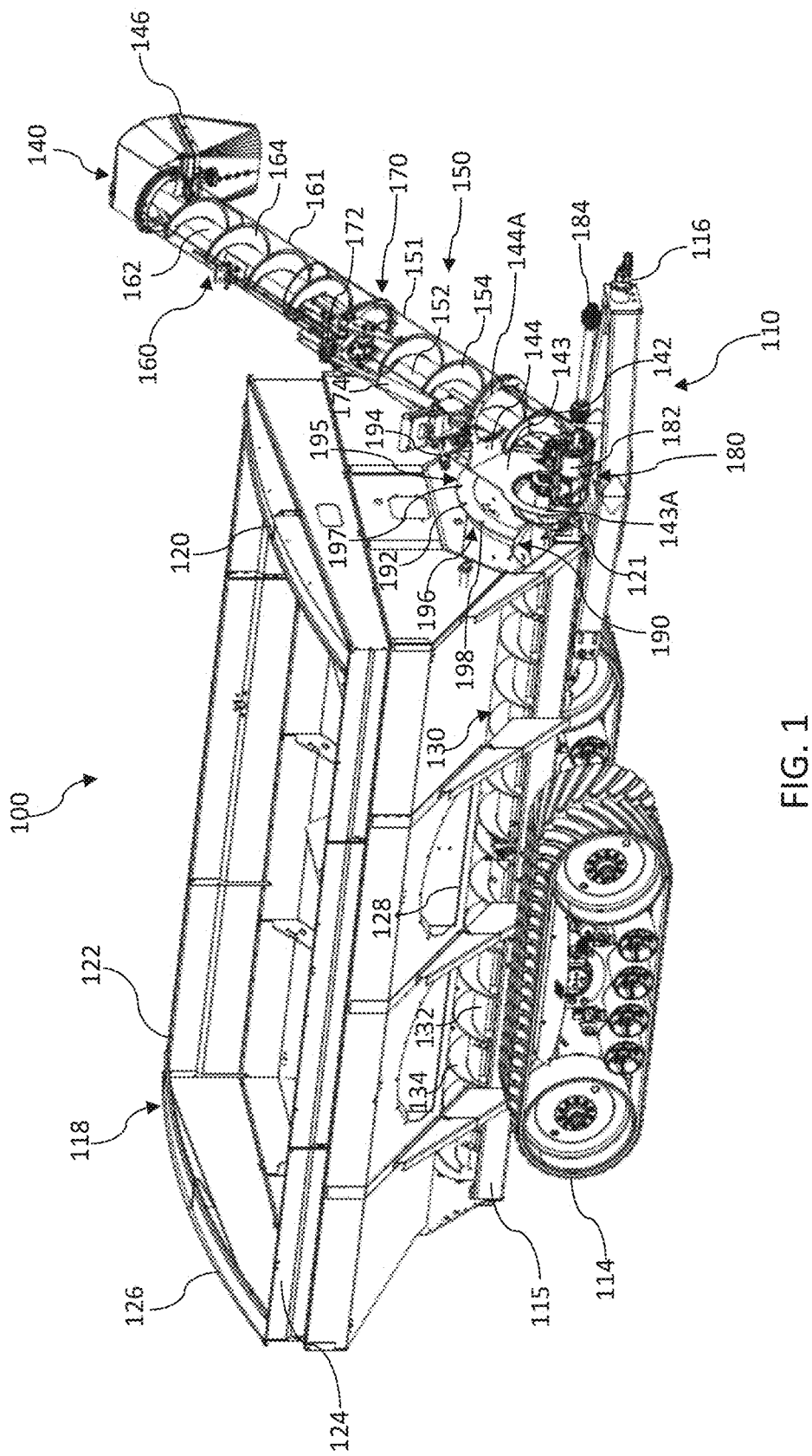
FIG. 1 is a perspective view of a grain cart having a dual auger assembly with the tubular housing depicted as transparent according to an exemplary embodiment.

While aspects of the subject matter of the present disclosure may be embodied in a variety of forms, the following description and accompanying drawings are merely intended to disclose some of these forms as specific examples of the subject matter. Accordingly, the subject matter of this disclosure is not intended to be limited to the forms or embodiments so described and illustrated.

Unless defined otherwise, all terms of art, notations and other technical terms or terminology used herein have the same meaning as is commonly understood by persons of ordinary skill in the art to which this disclosure belongs. All patents, applications, published applications and other publications referred to herein are incorporated by reference in their entirety. If a definition set forth in this section is contrary to or otherwise inconsistent with a definition set forth in the patents, applications, published applications, and other publications that are herein incorporated by reference, the definition set forth in this section prevails over the definition that is incorporated herein by reference.

Unless otherwise indicated or the context suggests otherwise, as used herein, "a" or "an" means "at least one" or "one or more."

This description may use relative spatial and/or orientation terms in describing the position and/or orientation of a component, apparatus, location, feature, or a portion thereof. Unless specifically stated, or otherwise dictated by the context of the description, such terms, including, without limitation, top, bottom, above, below, under, on top of, upper, lower, left of, right of, in front of, behind, next to, adjacent, between, horizontal, vertical, diagonal, longitudinal, transverse, radial, axial, etc., are used for convenience in referring to such component, apparatus, location, feature, or a portion thereof in the drawings and are not intended to be limiting.

Furthermore, unless otherwise stated, any specific dimensions mentioned in this description are merely representative of an exemplary implementation of a device embodying aspects of the disclosure and are not intended to be limiting.

As used herein, the term "adjacent" refers to being near or adjoining. Adjacent objects can be spaced apart from one another or can be in actual or direct contact with one another. In some instances, adjacent objects can be coupled to one another or can be formed integrally with one another.

As used herein, the terms "substantially" and "substantial" refer to a considerable degree or extent. When used in conjunction with, for example, an event, circumstance, characteristic, or property, the terms can refer to instances in which the event, circumstance, characteristic, or property occurs precisely as well as instances in which the event, circumstance, characteristic, or property occurs to a close approximation, such as accounting for typical tolerance levels or variability of the embodiments described herein.

Although the terms horizontal and vertical are used here with respect to augers, such augers may not be completely horizontal or completely vertical. For example, the vertical auger may be angled so as to increase a side reach and/or forward reach of the auger relative to the hopper. Likewise, the horizontal auger may have a slope to it, and may also move with the hopper as the grain cart travels over uneven terrain. The terms denote the general direction in which grain is moved, e.g. horizontal movement to displace grain to a lift auger or vertical movement to lift grain to a discharge height.

FIG. 1 depicts an exemplary grain cart 100 with a dual auger assembly 110 according to an embodiment of the present disclosure. As shown, the grain cart includes a grain holding container or hopper 118 mounted on a frame 115 with tracks 114 for moving the grain cart 100 and a hitch 116 for coupling the grain cart 100 to a vehicle (such as a tractor). In some embodiments, the grain cart may include wheels instead of (or in addition to) tracks 114. The hopper 118 includes a front wall or side 120, laterally opposed side walls 122 and 124, and a rear wall 126 or side, which together define a grain holding space with a bottom, and which may have an open top. In some embodiments, as shown in FIG. 1, the opposed side walls 122 and 124 of the hopper 118 are angled toward each other to form a trough 128 that extends along a bottom of the hopper 118 to promote grain flow toward the bottom of the hopper 118. In some embodiments the walls may be curved, or sloped differently than shown, in order to promote grain flow toward the bottom of the hopper 118. In some non-limiting embodiments (e.g. see FIG. 12), the front wall 120 may include an inclined portion proximately aligned with the trough 128 and an upright portion extending above the inclined portion.

The dual auger assembly 110 includes a horizontal auger assembly 130 disposed toward a bottom of or below the hopper 118 and extending substantially along the trough 128 of the hopper 118 so as to receive grain flow falling or flowing toward the bottom of the hopper 118. In some embodiments, the horizontal auger assembly 130 may extend along a substantial portion of the length of the hopper 118, up to and including the entire length of the hopper 118. The horizontal auger assembly 130 is configured to convey agricultural material (such as grain) collected at the bottom of the hopper 118 toward a discharge opening 121 disposed at the front wall 120 of the hopper 118. In some embodiments, grain cart 100 may have more or fewer augers than shown. For instance, grain cart 100 may have a single vertical auger assembly, where e.g. the vertical auger assembly receives grain from the hopper by gravity.

The horizontal auger assembly 130 may include one or more auger sections. As shown, the horizontal auger assembly 130 includes an auger section having a horizontal auger shaft 132 extending along the trough 128 of the hopper and defining a longitudinal axis (such as axis A-A shown in FIG. 3) of the auger section. The longitudinal axis may also be referred to as a centerline, where the axis extends through the center of the auger section along its length. The horizontal auger shaft 132 has auger flighting 134 and is configured to rotate about the longitudinal axis of the auger section causing the flighting to also rotate. The auger flighting 134 may be disposed along and project in a radial direction from the horizontal auger shaft 132. In some embodiments, auger flighting 134 may be a helical flighting wrapped or positioned around, and connected to the horizontal auger shaft 132. The horizontal auger shaft 132 extends through the discharge opening 121 of the hopper 118. The horizontal auger shaft 132 includes an end (such as a first end 302 shown in FIG. 3) disposed proximate to the discharge opening 121. The horizontal auger assembly 130 is shown in FIG. 1 for illustrative purposes with the auger shaft and flighting exposed. In some embodiments, the auger shaft and flighting is covered and/or concealed by an auger housing; the auger shaft and flighting may also be covered and/or concealed by one or more of frame 115 and walls or siding of hopper 118. Where an auger housing is used for one or more auger sections of the horizontal auger assembly 130, the housing may include an opening (e.g. an opening on an upper side of the housing) for receiving grain from the hopper 118 and/or trough 128.

The exemplary dual auger assembly 110 shown also includes a substantially vertical auger assembly 140 located at a front the grain cart 100. In some embodiments, the vertical auger assembly 140 may be located at a rear, or on another side of the grain cart 100, including at or near a corner of the grain cart 100. The dual auger assembly 110 includes an intake housing 142 positioned proximate to the discharge opening 121 to receive agricultural material from the bottom of the hopper (via horizontal auger assembly 130). The intake housing 142 defines a junction or transition zone, where agricultural material is received from the horizontal auger assembly 130 and redirected to the vertical auger assembly 140. As shown in FIG. 1, the intake housing 142 may comprise a back wall 143 facing the front wall 120 of the hopper 118 and an inlet 143A disposed along the back wall 143 to receive agricultural material conveyed from the horizontal auger assembly 130. The intake housing 142 may comprise a top wall 144 projecting from the back wall 143 and an outlet 144A disposed along the top wall 144 to discharge agricultural material out of the intake housing 142 and into the vertical auger assembly 140. In some embodiments, the intake housing 142 is substantially symmetrical about a longitudinal axis extending through the outlet 144A.

The vertical auger assembly 140 may include a discharge portion 146 laterally and forwardly spaced from the hopper 118. In some embodiments, the discharge portion 146 is a spout comprising an outlet configured to discharge agricultural material. As shown in FIG. 1, the vertical auger assembly 140 extends upwardly from the intake housing 142 to the discharge portion 146. In some embodiments, the discharge opening 121 opens into the intake housing 142 such that the vertical auger assembly 140 is in communication with the horizontal auger assembly 130. The vertical auger assembly 140 is configured to receive agricultural material discharged from the horizontal auger assembly 130 at the intake housing 142 and convey agricultural material to the discharge portion 146 to facilitate discharge of the agricultural material into another container such as, for instance, another grain cart, semi-trailer, or rail car located to the side or in the vicinity of the grain cart 100. In the illustrated embodiment, the discharge portion 146 and housing of the vertical auger assembly 140 (e.g., lower auger housing 151 and upper auger housing 161) are configured to rotate together to two or more angular positions. In some other non-limiting embodiments (not shown), the discharge portion 146 is rotatably coupled to housing (e.g., upper auger housing 161) of the vertical auger assembly 140, such that the discharge portion 146 rotates independent of the housing of the vertical auger assembly 140. In some embodiments, the discharge portion 146 includes a rotating actuator (not shown) (e.g., hydraulic motor with gears) configured to rotate the discharge portion 146 to two or more angular positions.

The vertical auger assembly 140 may include one or more auger sections. As shown, the vertical auger assembly 140 includes a lower auger section 150 and an upper auger section 160. Folding joint assembly 170 connects the lower auger section 150 to the upper auger section 160. Folding joint assembly 170 is configured to connect the lower auger section 150 with the upper auger section 160 such that the upper auger section 160 may be moved between an operating position extending laterally and forwardly outward from the forward corner of the hopper 118 and a transport position folded diagonally across the front wall 120 of the hopper 118, such as one of the auger assemblies described in U.S. Pat. No. 9,039,340, entitled "Grain Cart with Folding Auger"; the entire contents of which are herein incorporated by reference. In some embodiments, the folding joint assembly 170 may include a hinge 172 that pivotably connects the upper auger section 160 to the lower auger section 150 and a folding actuator 174 (e.g., hydraulic cylinder) comprising a rod that is configured to contract and expand to move the upper auger section 160 between the operating position and the transport position. While two auger sections are shown for the vertical auger assembly 140, embodiments may include more auger sections or fewer auger sections, including a single auger section. Additionally, while folding joint assembly 170 is shown as connecting upper auger section 160 and lower auger section 150, other joint assemblies or couplings may be used to connect or join different auger sections together. For example, a universal joint may be used to connect two auger sections together, such as where the two auger sections are angled with respect to each other and the universal joint allows the transfer of rotational force through an angle.

As shown, the lower auger section 150 extends from intake housing 142 near the bottom of hopper 118 to a front corner of the hopper 118 where the one of the laterally opposed side walls 122 or 124 intersects front wall 120. In some embodiments, the lower auger section 150 extends from intake housing 142 to a point proximally adjacent to a front corner, immediately adjacent to a front corner, or disposed at or substantially at a front corner of the hopper 118. As described below, the vertical auger assembly 140 is capable in some embodiments of moving or pivoting substantially in a plane parallel to the front wall 120. In such embodiments, the position of the lower auger section 150 may change as the vertical auger assembly 140 is moved or pivoted.

The lower auger section 150 includes a tubular-shaped lower housing 151 extending from the intake housing 142 and a lower auger shaft 152 disposed within the lower housing 151. The lower auger shaft 152 defines a longitudinal axis (such as axis B-B shown in FIG. 3) of the lower auger section 150. The longitudinal axis may also be referred to as a centerline, where the axis extends through the center of the lower auger section 150 along its length. The lower auger shaft 152 has a lower auger flighting 154 and is configured to rotate about the longitudinal axis of the lower auger section 150 causing the flighting to also rotate. The lower auger flighting 154 may be disposed along and projecting in a radial direction from the lower auger shaft 152. In some embodiments, the lower auger flighting 154 may be a helical flighting wrapped or positioned around, and connected to, the lower auger shaft 152. The lower auger shaft 152 includes an end (such as intake end 304, shown in FIG. 3) disposed in the intake housing 142 and another end (such as discharge end 306, shown in FIG. 3) laterally and forwardly spaced from the hopper 118.

Figure 2:
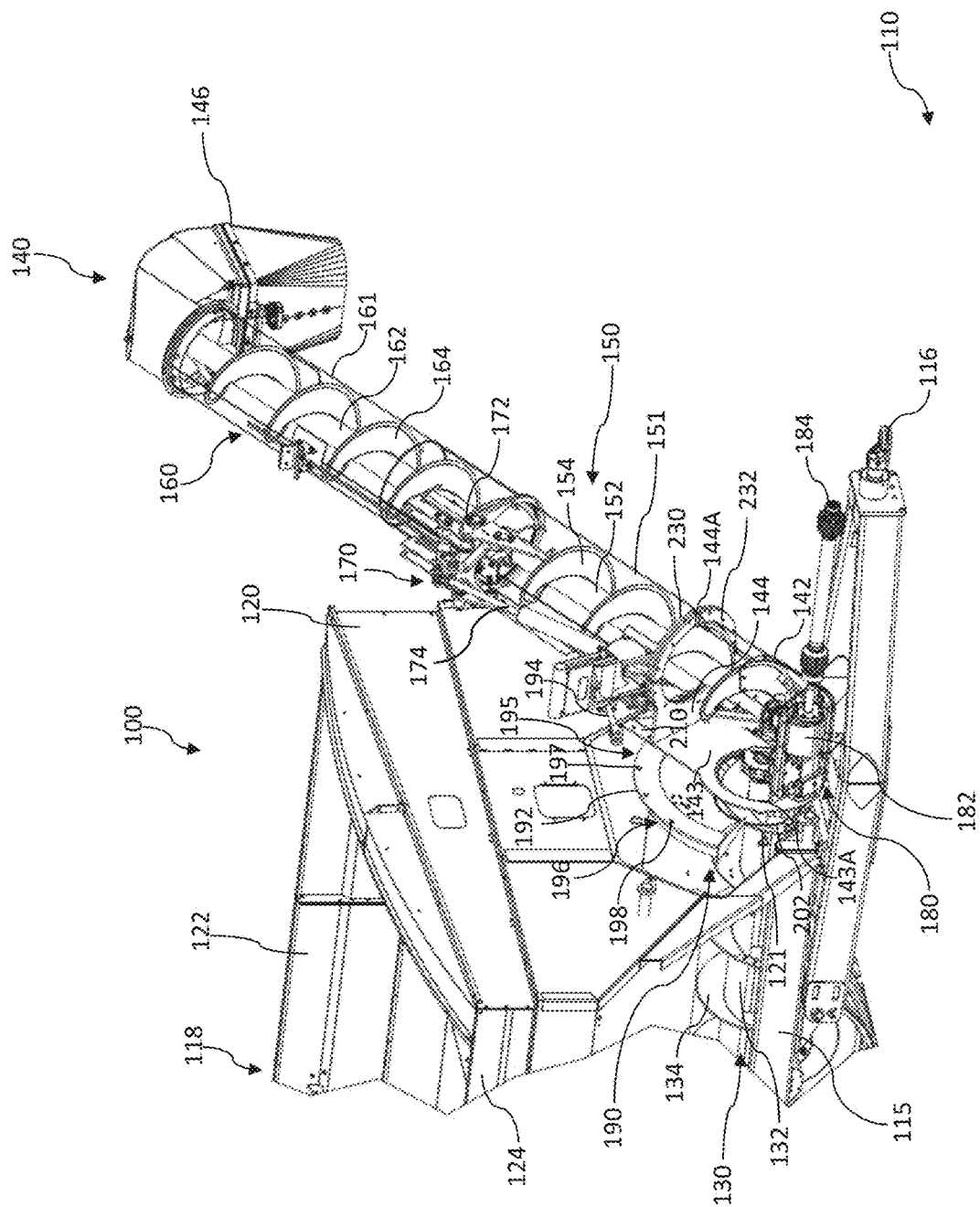
FIG. 2 is a detailed perspective view of the dual auger assembly with the tubular housing depicted as transparent according to an exemplary embodiment.

As shown in FIG. 2, the lower auger housing 151 comprises a flange 230 projecting in a radial direction from a first end of the lower auger housing 151 and rotatably received on the outlet 144A of the intake housing 142, such that the lower auger housing 151 is configured to rotate on the outlet 144A between two or more angular positions. The vertical auger assembly 140 may include one or more auger housing fasteners 232 inserted through the flange 230 of the lower housing 151 and the outlet 144A of the intake housing 142 to lock the lower auger housing 151 at a respective angular position.

The upper auger section 160 extends from the lower auger section 150 to the discharge portion 146. The upper auger section 160 comprises a tubular-shaped upper housing 161 and an upper auger shaft 162 disposed within the upper housing 161. The upper auger shaft 162 defines a longitudinal axis (such as axis B-B shown in FIG. 3) of the upper auger section 160. The longitudinal axis may also be referred to as a centerline, where the axis extends through the center of the upper auger section 160 along its length. As illustrated, lower and upper auger sections 150 and 160 are in-line with each other, meaning that they share a longitudinal axis (when in an operating, non-folded position). In some embodiments, lower and upper auger sections 150 and 160 may be out-of-line with each other, meaning that they have different, non-parallel longitudinal axes. The upper auger shaft 162 has an upper auger flighting 164 and is configured to rotate about the longitudinal axis of the upper auger section 160 causing the flighting to also rotate. The upper auger flighting 164 may be disposed along and projecting in a radial direction from the upper auger shaft 162. In some embodiments, the upper auger flighting 164 may be a helical flighting wrapped or positioned around, and connected to, the upper auger shaft 162. In some embodiments, referring to FIGS. 3 and 4, the upper auger shaft 162 includes an intake end 308 configured to operatively connect to the discharge end 306 of the lower auger shaft 152 and a discharge end (not shown) disposed proximate to or in the discharge portion 146. The vertical auger assembly 140 is shown in FIG. 1 for illustrative purposes with the auger shaft and flighting exposed. In some embodiments, the auger shaft and flighting is covered and/or concealed by an auger housing, such as lower auger housing 151 and upper auger housing 161.

The dual auger assembly 110 further includes a drive assembly 180. In embodiments, the drive assembly 180 is disposed in or around the intake housing 142 at the front of the grain cart 100. The drive assembly 180 is operatively connected to a power input device 184, which in some embodiments may be an input shaft configured to be driven by a power take off (PTO) shaft of a vehicle towing the grain cart 100. The drive assembly 180 is also operatively connected to the horizontal auger shaft 132 of the horizontal auger assembly 130, and the lower auger shaft 152 of the vertical auger assembly 140. The drive assembly 180 is configured to transmit torque (e.g., rotation) applied by the power input device 184 to both the horizontal auger shaft 132 and the lower auger shaft 152, such that the drive assembly 180 drives rotation of these auger shafts.

The power input device 184 may be releasably connected to the PTO shaft of a vehicle towing the grain cart 100 and is configured to transmit torque applied by the PTO to other components of the drive assembly 180. In some embodiments, referring for example to FIGS. 3 and 4, the drive assembly 180 includes a first drive member 322 operatively connected to a first end 302 of the horizontal auger shaft 132 to drive the horizontal auger shaft 132 and a second drive member 324 operatively connected to the intake end 304 of the lower auger shaft 152 to drive the lower auger shaft 152. The drive assembly may also include a casing 182 disposed in or near the intake housing 142 and enclosing all or part of the power input device 184, the first drive member 322, and the second drive member 324.

Figure 3:
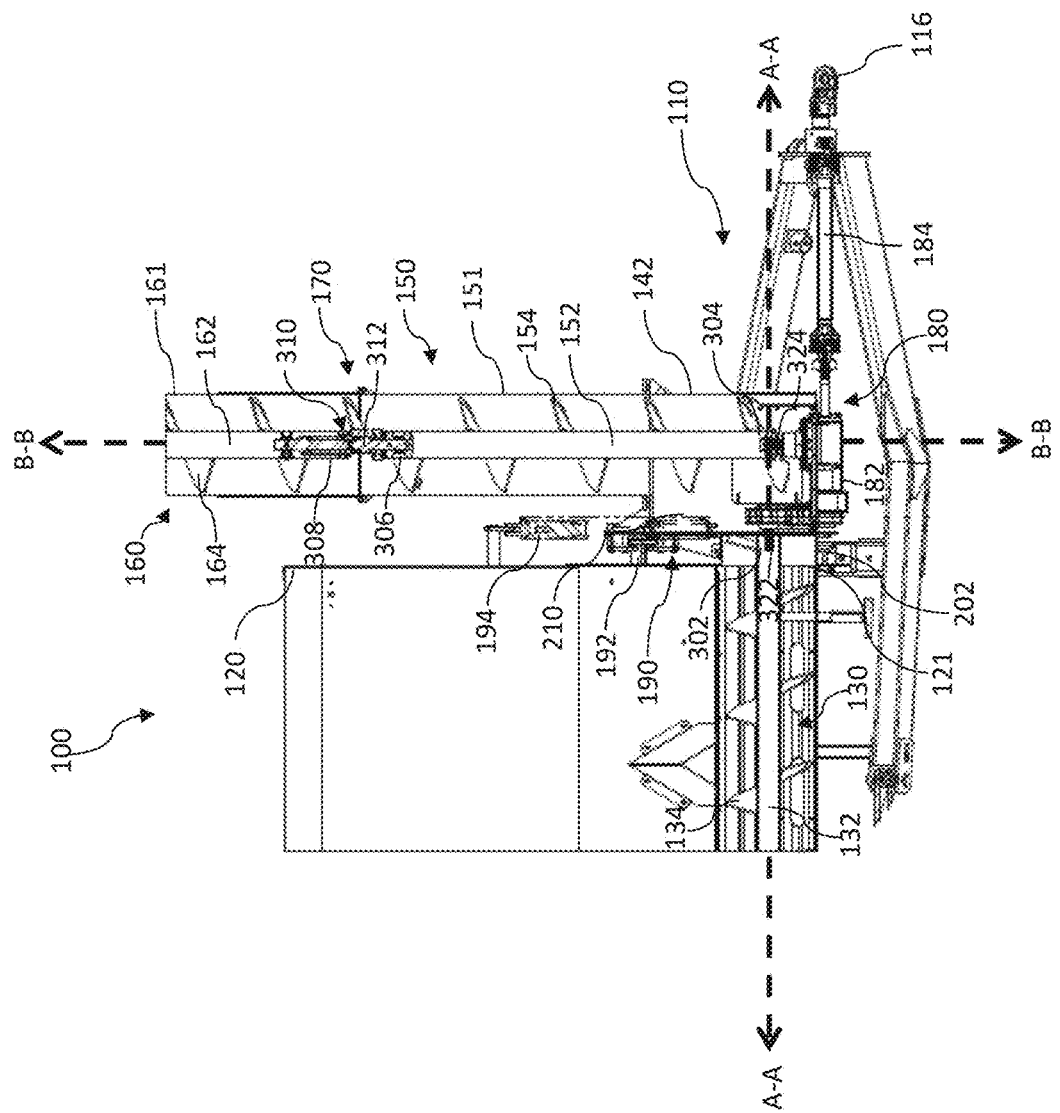
FIG. 3 is a cross-sectional view of the dual auger assembly with a drive assembly according to an exemplary embodiment.
Figure 4:
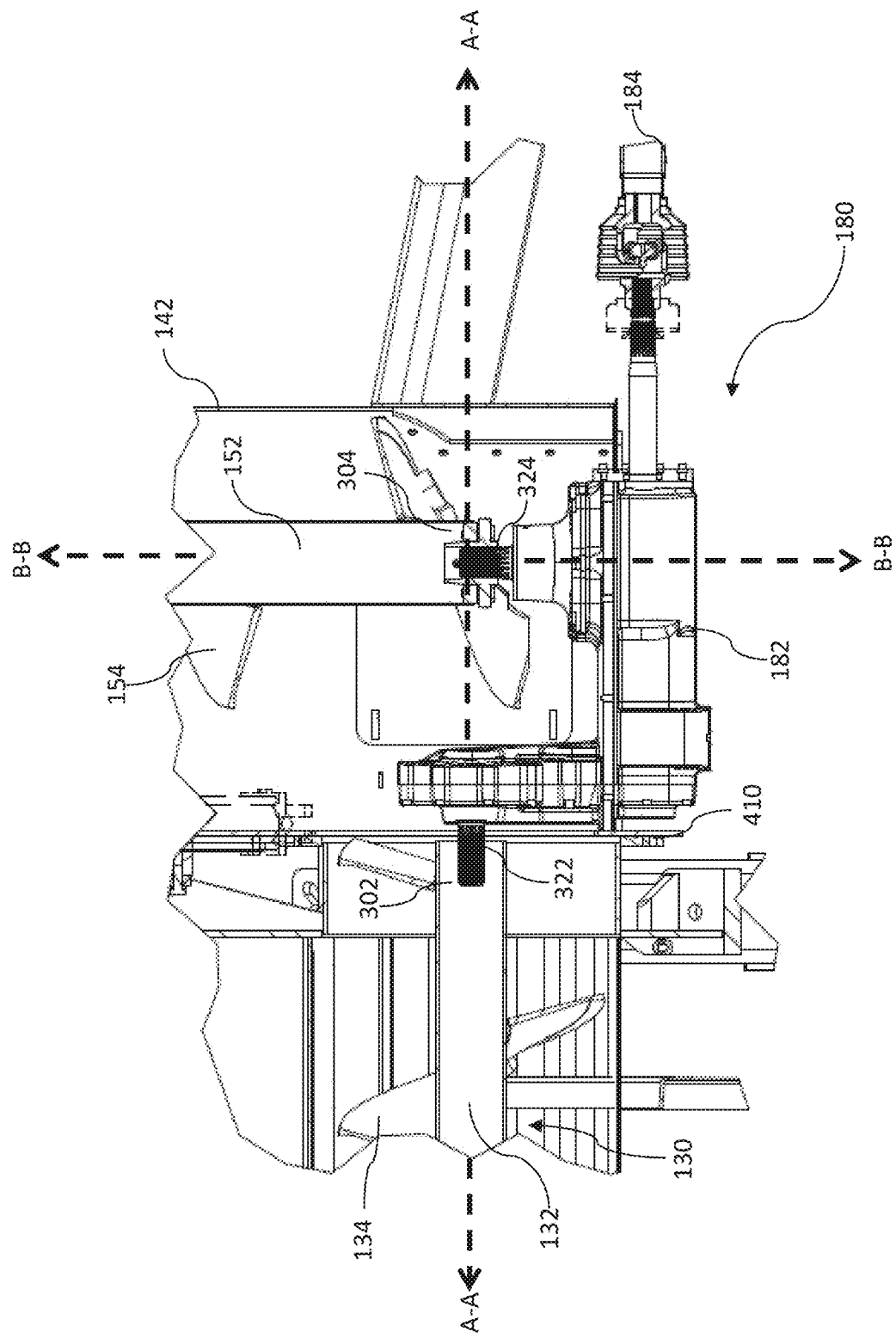
FIG. 4 is a detailed cross-sectional view of the dual auger assembly with a drive assembly according to an exemplary embodiment.

As shown in FIG. 3, the spatial arrangement of the first drive member 322 and the second drive member 324 with respect to the power input device 184 and the horizontal and lower auger shafts 132, 152 allows the longitudinal axes A-A and B-B of the horizontal and lower auger shafts 132, 152 to lie in the same plane (i.e., the longitudinal axes are coplanar). The spatial arrangement of the first drive member 322 and the second drive member 324 with respect to the power input device 184 and the horizontal and lower auger shafts 132, 152 further allows the lower auger flighting 154 to extend at least in part below the longitudinal axis A-A of the horizontal auger shaft 132. By allowing the horizontal and lower auger shafts 132, 152 to be coplanar and the lower auger flighting 154 to extend below the centerline of the horizontal auger shaft 132, the drive assembly 180 minimizes the substantially flighting-free space in the intake housing 142, thereby reducing the likelihood of agricultural material getting stuck or compressed at the junction between the horizontal and vertical auger assemblies 130, 140. Accordingly, the drive assembly 180 according to various embodiments described herein promotes substantially even distribution of agricultural material throughout the length of the dual auger assembly 110 and reduces grain compression around casing 182 of the drive assembly 180.

In some embodiments, the vertical auger assembly 140 comprises an auger shaft coupling assembly 310 (shown in FIG. 3) disposed between the discharge end 306 of the lower auger shaft 152 and the intake end 308 of the upper auger shaft 162. The auger shaft coupling assembly 310 is configured to releasably connect the discharge end 306 of the lower auger shaft 152 to the intake end 308 of the upper auger shaft 162 when the vertical auger assembly 140 is set in an operating position. When the vertical auger assembly 140 is set in an operating position and the discharge end 306 of the lower auger shaft 152 is operatively connected to the intake end 308 of the upper auger shaft 162, the auger shaft coupling assembly 310 is configured to transmit torque applied from the lower auger shaft 152 to the upper auger shaft 162 such that the lower auger shaft 152 and the upper auger shaft 162 rotate together to convey agricultural material from the intake housing 142 to the discharge portion 146 of the vertical auger assembly 140. In some embodiments, the auger shaft coupling assembly 140 comprises a joint 312 configured to transmit rotation forces from the lower auger shaft 152 to the upper auger shaft 162. According to some embodiments of the present disclosure, the joint 312 is a universal joint (also known as a universal coupling, a U-joint, a Cardan joint, a Hardy-Spicer joint, or a Hooke's joint). However, any joint that allows the transfer of rotational motion through an angle may be acceptable.

Figure 5:
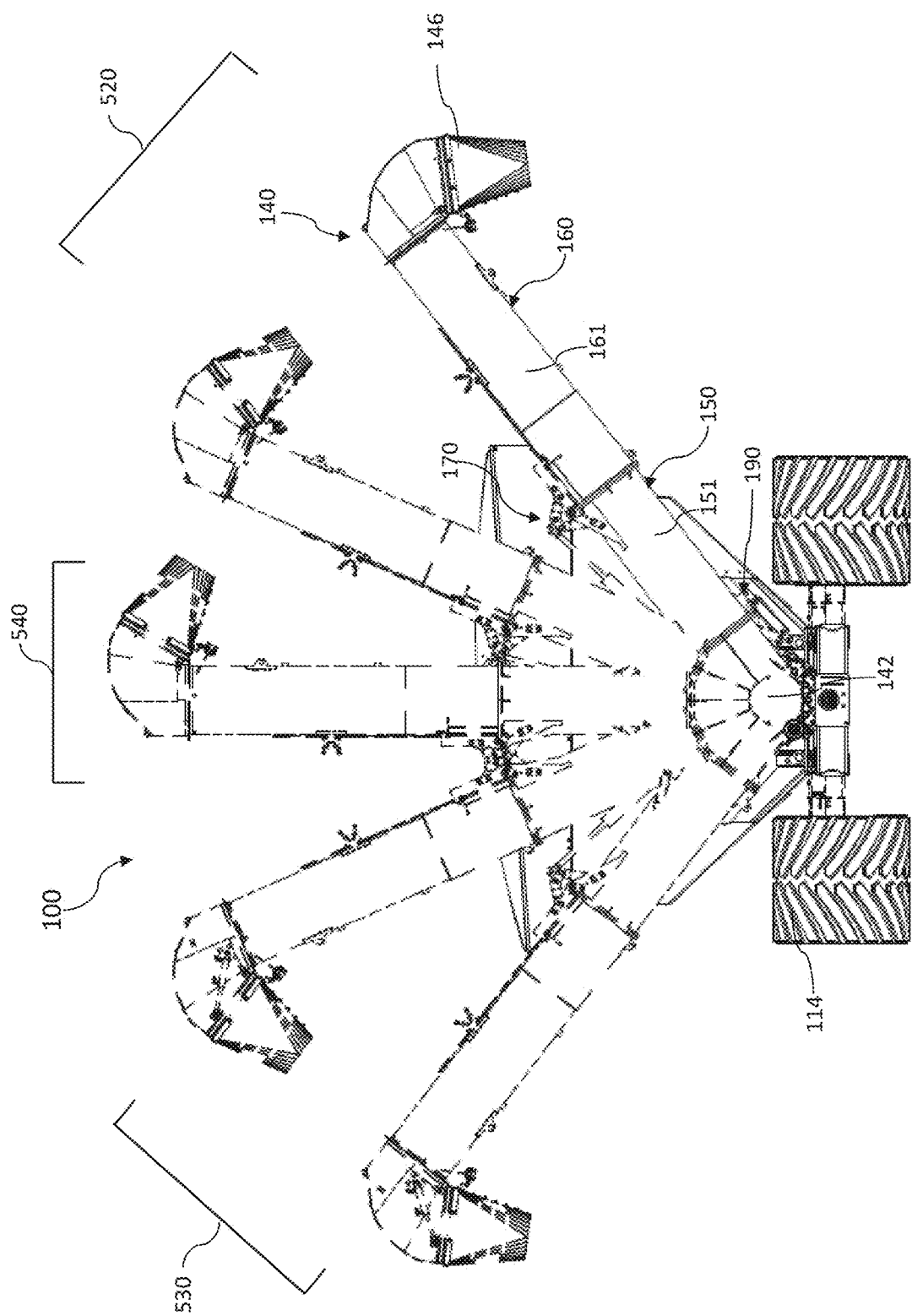
FIG. 5 is a front view of a grain cart having a dual auger assembly with a vertical auger assembly set in multiple operating positions according to an exemplary embodiment

In some embodiments, grain cart 100 may include a slide assembly 190 that couples the vertical auger assembly 140 to the front wall 120 of the hopper 118. As shown in FIG. 5, the slide assembly 190 is configured to allow the vertical auger assembly 140 to move or pivot substantially in a plane parallel to the front wall 120. That is, the vertical auger assembly 140 may move or pivot in the left-or-right directions with respect to the front wall 120 of the hopper 118. When doing so, the vertical auger assembly 140 may move between one or more operating positions along a first unloading range 520 where the vertical auger assembly discharges agricultural material about a first side of the grain cart 100 (e.g., a right-hand side of the grain cart 100) and one or more operating positions along a second unloading range 530 where the vertical auger assembly 140 discharges agricultural material about a second side of the grain cart 100 (e.g., a left-hand side of the grain cart 100). Accordingly, the slide assembly 190 according to the present disclosure allows the dual auger assembly 110 to unload agricultural material held in the hopper 118 to storage containers or vehicles disposed on either side of the grain cart 100.

In some embodiments, when the vertical auger assembly 140 pivots between the first and second unloading ranges 520 and 530, the lower auger housing 151, the upper auger housing 161, and the discharge portion 146 rotate together between two or more angular positions. At the same time, the auger shafts 152 and 162 may be configured not to rotate, as the lower auger housing 151, the upper auger housing 161, and the discharge portion 146 rotate between the two or more angular positions. In some embodiments, the two or more angular positions may include a first angular position, where the discharge portion 146 is pointed in a first direction, such that the discharge portion 146 is configured to discharge agricultural material about the first side of the hopper 118. The two or more angular positions may include a second angular position, where the discharge portion 146 is pointed in a second direction, opposite to the first direction, such that the discharge portion 146 is configured to discharge agricultural material about the second side of the hopper 118. As shown in FIG. 5, when the vertical auger assembly 140 is set at the one or more operating positions along the first unloading range 520, the discharge portion 146 is set at the first angular position to discharge agricultural material about the first side of the hopper 118. When the vertical auger assembly 140 is set at the one or more operating positions along the second unloading range 530, the discharge portion 146 is set at the second angular position to discharge agricultural material about the second side of the hopper 118.

In some embodiments, the vertical auger assembly 140 may operate at only a single operating position along the first unloading range 520 to discharge agricultural material from the first side of the hopper 118 and a single position along the second unloading range 530 to discharge agricultural material from the second side of the hopper 118. In some other embodiments, the vertical auger assembly 140 may operate at least two operating positions along either the first or second unloading range 520 and 530 to adjust the height or reach of the discharge portion 146 at either side of grain cart 100. For example, as shown in FIG. 5, a height between the discharge portion 146 and a ground surface changes as the vertical auger assembly 140 moves between several operating positions shown (positions are indicated in the figure by a dashed line showing the position of the vertical auger assembly 140).

In some embodiments, the first unloading range 520 may be separated from the second unloading range 530 by a predetermined non-unloading range 540, where the vertical auger assembly 140 is not configured to discharge agricultural material. In some embodiments, the vertical auger assembly 140 may move to one or more idle operating positions disposed along the first, second, and non-unloading ranges 520, 530, and 540. At the idle operating position, the vertical auger assembly 140 (e.g., the lower auger housing 151 and the upper auger assembly 161) may be configured to rotate about centerline of the lower and upper auger sections 150 and 160 to adjust the angular position of the discharge portion 146, and at the same time, not discharge agricultural material. In some embodiments, the vertical auger assembly 140 may be located at a first idle operating position disposed along the non-unloading range 540 where the vertical auger assembly 140 is oriented substantially upright with respect to the ground. At the first idle operating position, the vertical auger assembly 140 may rotate about centerline of the lower and upper auger sections 150 and 160 so that the discharge portion 146 rotates from the first angular position to the second angular position. In some embodiments, one of the idle positions and one of the unloading positions may be at a same angle, or may be at different angles.

In some embodiments, the slide assembly 190 may include a slide rail 192 mounted to the front wall 120 of the hopper 118. In some embodiments, the slide rail 192 may be mounted to the inclined portion of the front wall 120. In the illustrated, non-limiting embodiment, the slide rail 192 defines a first range of pivoting by the vertical auger assembly 140 along a first plane extending transverse to the frame 115 or parallel to the front wall 120. In some embodiments, the first range of pivoting defined by the slide rail 192 encompasses the aggregate degree of the first and second unloading ranges 520 and 530 and the non-unloading range 540, so that the vertical auger assembly 140 may slide along the slide rail 192 when moving from an operating position disposed along the first unloading range 520 to an operating position disposed along the second unloading range 530. For example, the first range of pivoting defined by the slide rail 192 ranges from about 30° to 150° along the first plane relative to a horizontal axis extending transverse to the longitudinal axis of the horizontal auger shaft 132. However, in other alternative embodiments (see FIGS. 13-25), the slide rail may define a smaller range of pivoting by the vertical auger assembly 140 that encompasses the degree of only one of the first or second unloading ranges 520 and 530.

In some embodiments, as shown in FIGS. 2 and 3, the slide assembly 190 may include a rail follower 210 projecting from the intake housing 142. In other embodiments, the rail follower may be connected to the lower auger housing 151. The rail follower 210 may be slidably coupled to the rail 192 such that the vertical auger assembly 140 is configured to move along the rail 192 to the one or more operating positions, including a first operating position along the first unloading range 520 and a second operating position disposed along the second unloading range 530. In some embodiments, the rail follower 210 may include a plate extending from the back wall 143 of the intake housing 142 and a bracket projected from the plate and received on the slide rail 192.

In some embodiments, the slide assembly 190 may include a sliding actuator 194 (e.g., hydraulic cylinder) operatively connected to the hopper 118 and the vertical auger assembly 140 and configured to move the vertical auger assembly 140 to the one or more operating positions, including the first operating position along the first unloading range 520 and the second operating position disposed along the second unloading range 530. In some embodiments, the sliding actuator 194 is a hydraulic cylinder configured to expand and retract to move or pivot the vertical auger assembly 140 to the one or more operating positions. In alternative embodiments (not shown), the slide assembly 190 may include other components suitable to move the vertical auger assembly 140 to the one or more operating positions, such as, for example, a gear set, a threaded shaft with a bushing, stepper motor, etc.

In various embodiments, the slide assembly 190 may include one or more mounting assemblies to mount the slide rail 192 and the vertical auger assembly 140 to the front wall 120 of the hopper 118. In some embodiments, the slide assembly 190 includes a first mounting assembly 195 disposed on or adjacent to the front wall 120 proximate to the first side of the hopper 118. In some embodiments, the slide assembly 190 includes a second mounting assembly 196 disposed on or adjacent to the front wall 120 proximate to the second side of the hopper 118. In the illustrative embodiment shown in FIGS. 1-11, the slide rail 192 is mounted on both of the first and second mounting assemblies 195 and 196 when mounted along the front wall 120 at a single mounting position. However, in other embodiments (see FIGS. 13-25), the slide rail may be mounted along the front wall 120 on only one of the first and second mounting assemblies 195 and 196, without being mounted to the other one of the first and second mounting assemblies 195 and 196.

In some embodiments, the first mounting assembly 195 may include one or more wall mounting holes (not shown) disposed along front wall 120 proximate to the first side of the hopper 118 and one or more rail mounting holes 197 disposed along the side rail 192 proximate to the first side of the hopper 118. The first mounting assembly 195 may include one or more rail fasteners (not shown) configured to extend through at least one of the wall mounting holes and rail mounting holes 197 to secure the slide rail 192 to the front wall 120 and one or more locking members (not shown) configured to extend through at least one of the rail mounting holes 197 and the rail follower 210 to selectively secure the vertical auger assembly 140 to the slide rail 192 at an operating position disposed along the first unloading range 520. In some embodiments, the rail fastener or locking member may include a screw, bolt, rivet, pin, etc.

In some embodiments, the second mounting assembly 196 may include one or more wall mounting holes (not shown) disposed along front wall 120 proximate to the second side of the hopper 118 and one or more rail mounting holes 198 disposed along the slide rail 192 proximate to the second side of the hopper 118. The second mounting assembly 196 may include one or more rail fasteners (not shown) configured to extend through at least one of the wall mounting holes and rail mounting holes 197 to secure the slide rail 192 to the front wall 120 and one or more locking members (not shown) configured to extend through at least one of the rail mounting holes 198 and the rail follower 210 to selectively secure the vertical auger assembly 140 to the slide rail 192 at an operating position disposed along the second unloading range 530. In some embodiments, the rail or auger fasteners may include a screw, bolt, rivet, pin, etc.

In some embodiments, the vertical auger assembly 140 may be mounted on one of rail mounting holes 197 of the first mounting assembly 195 via the locking member at the first operating position without being mounted on the rail mounting holes 198 of the second mounting assembly 196. When the vertical auger assembly 140 is mounted on one of the rail mounting holes 197 of the first mounting assembly 195 via the locking member, the vertical auger assembly 140 is locked at the first operating position and not configured to slide along the slide rail 192. In some embodiments, the vertical auger assembly 140 may be mounted on one of the rail mounting holes 198 of the second mounting assembly 196 via the locking member at the second operating position without being mounted on the rail mounting holes 197 of the first mounting assembly 195. When the vertical auger assembly 140 is mounted on one of the rail mounting holes 198 of the second mounting assembly 196 via the locking member, the vertical auger assembly 140 is locked at the second operating position and not configured to slide along the slide rail 192.

The slide assembly 190 may further include a rotatable connection between the intake housing 142 and a housing extension of the horizontal auger assembly 130. For example, in some embodiments, as shown in FIG. 2, the front wall 120 includes an auger housing extension 202 projecting along the perimeter of the discharge opening 121 in an axial direction. In some embodiments, the auger housing extension 202 projects orthogonally with respect to the front wall 120.

In various embodiments, a transverse dimension (e.g., diameter) of the auger housing extension 202 is greater than a transverse dimension (e.g., diameter) of the horizontal auger flighting 134. In some embodiments, the transverse dimension of the auger housing extension 202 is about 1 to 2 inches greater than the transverse dimension of the horizontal auger flighting 134. In other embodiments, the transverse dimension of the auger housing extension 202 is at least 2 inches greater than the transverse dimension of the horizontal auger flighting 134 to increase higher grain flow into the intake housing 142 and decrease grain pressure around the drive assembly 180.

In some non-limiting embodiments, the slide assembly 190 includes a pivot ring 410 disposed along a distal end of the auger housing extension 202 and rotatably engaged with the intake housing 142. The intake housing 142 is configured to rotatably connect with the auger housing extension 202 via the pivot ring 410 so that the intake housing 142 rotates about the auger housing extension 202 as the sliding actuator 194 slides the rail follower 210 along the rail 192. The intake housing 142, along with the rest of the vertical auger assembly 140, pivots about axis A-A (as shown in FIG. 3) defined by lower auger shaft 132 when moving to the one or more operating positions. In other embodiments (not shown), the auger housing extension 202 projects from an end of the intake housing 142 and is rotatably coupled to the front wall 120, where the pivot ring 410 is disposed along the front wall 120 and rotatably engaged with the auger extension 202 of the intake housing 142.

In other embodiments (not shown), the slide assembly 190 may further include other components to provide support for the vertical auger assembly 140 at least in a longitudinal direction such that the slide assembly 190 helps carry the load applied by the vertical auger assembly 140 to the pivot ring 410 on the housing extension 202. In other embodiments (not shown), the slide rail 192 may further include other components to provide support for the vertical auger assembly 140 at least in a lateral direction transverse to the longitudinal direction, so that the slide rail 192 may prevent rotation of the vertical auger assembly 140 when set a predetermined operating position.

Referring to FIGS. 6-11, the hopper 118 may include a lug assembly 600 comprising a plurality of lugs 602-608 connected to the hopper 118. The lugs 602-608 may be directly connected to the front wall 120 of the hopper 118 or connected along a rail that extends along a side of the hopper 118 proximate to the front wall 120 (See FIG. 14). The lug assembly 600 may include a first lower lug 602 disposed proximate to the first side of the hopper 118, a first upper lug 604 disposed above the first lower lug 602 and proximate to the first side of the hopper 118, a second lower lug 606 disposed proximate to the second side of the hopper 118, and a second upper lug 608 disposed above the second lower lug 606 and proximate to the second side of the hopper 118. In some embodiments, the lugs 602-608 may be comprised of a cylindrical-shaped projection and a mounting head disposed at the end of the projection, and the mounting head includes a hole to receive a fastener. In other embodiments, the lugs may be comprised of a cylindrical-shaped projection defining a hole to receive a fastener.

FIGS. 6-11 illustrate an exemplary operation of using the slide assembly 190 to move the vertical auger assembly 140 from a first operating position (e.g., a first lower operating position) disposed along the first unloading range 520, where the vertical auger assembly is configured to discharge agricultural material about the first side of the hopper 118, to a second operating position (e.g., a second lower operating position) disposed along the second unloading range 530, where the vertical auger assembly 140 is configured to discharge agricultural material about the second side of the hopper 118. In operation, the slide actuator 194 may be removably coupled to the rail follower 210 and at least one of the lugs 602-608 to move the vertical auger assembly 140 to at least one of the operating positions. For example, the slide actuator 194 may include a first end 194A that may be removably coupled to at least one of the plurality of lugs 602-608 and a second end 194B that may be removably coupled to the first or second sides 611 and 612 of the rail follower 210. In some embodiments, the first end 194A is an end of a hydraulic cylinder, and the second end 194B is the end of a piston rod received in the hydraulic cylinder and configured to extend or retract out of a cylinder.

Figure 6:
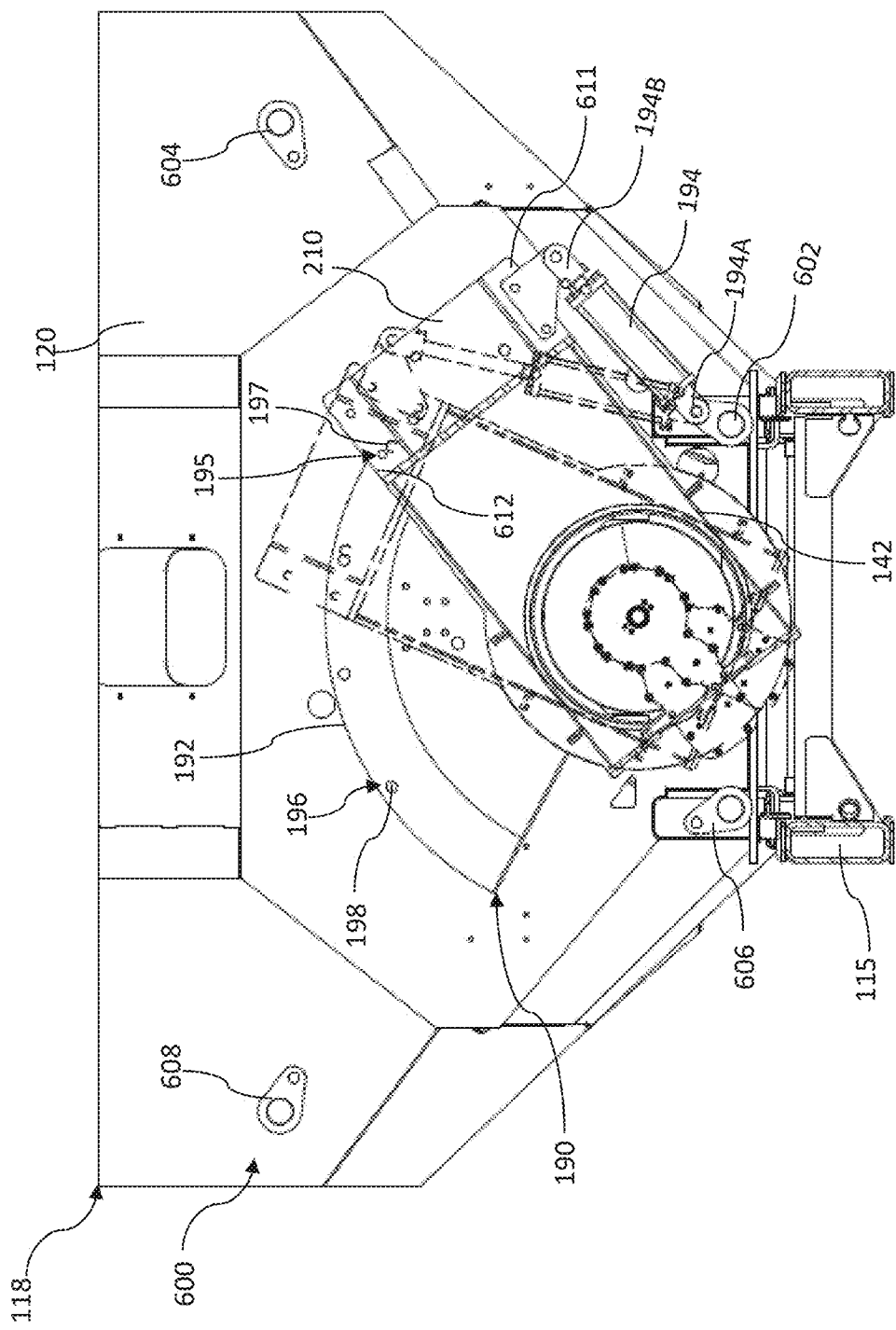
FIG. 6 is a detailed front view of a grain cart having a dual auger assembly with an intake housing moving from a first lower operating position to a first higher operating position according to an exemplary embodiment. The vertical auger assembly is removed from the drawing for clarity purposes.

FIG. 6 shows a front view of the grain cart 100, where the intake housing 142 is moving from a first lower operating position (represented by solid lines) to a first higher operating position (represented by dashed lines). As shown in FIG. 6, the slide actuator 194 may be removably coupled to the first lower lug 602 and a first side 611 of the rail follower 210. For example, the first end 194A of the slide actuator 194 may be coupled to the first lower lug 602, and the second end 194B of the slide actuator 194 may be coupled to the first side 611 of the rail follower 210. When coupled to the first lower lug 602 and the first side 611 of the rail follower 210, the slide actuator 194 extends below the vertical auger assembly 140, and is configured to move the vertical auger assembly 140 to one or more positions disposed along the first unloading range 520 by extending or retracting the second end 194B. For example, as shown in FIG. 6, when coupled to the first lower lug 602 and the first side 611 of the rail follower 210, slide actuator 194 may move the vertical auger assembly 140 from a first lower operating position disposed along the first unloading range 520 to a first higher operating position disposed along the first unloading range 520, whereby the first higher operating position corresponds to the highest position of the vertical auger assembly 140 along the first unloading range 520. As shown in FIG. 6, the slide actuator 194 is represented by solid lines when set in a contracted state and dashed-lines when set in an extended state.

Figure 7:
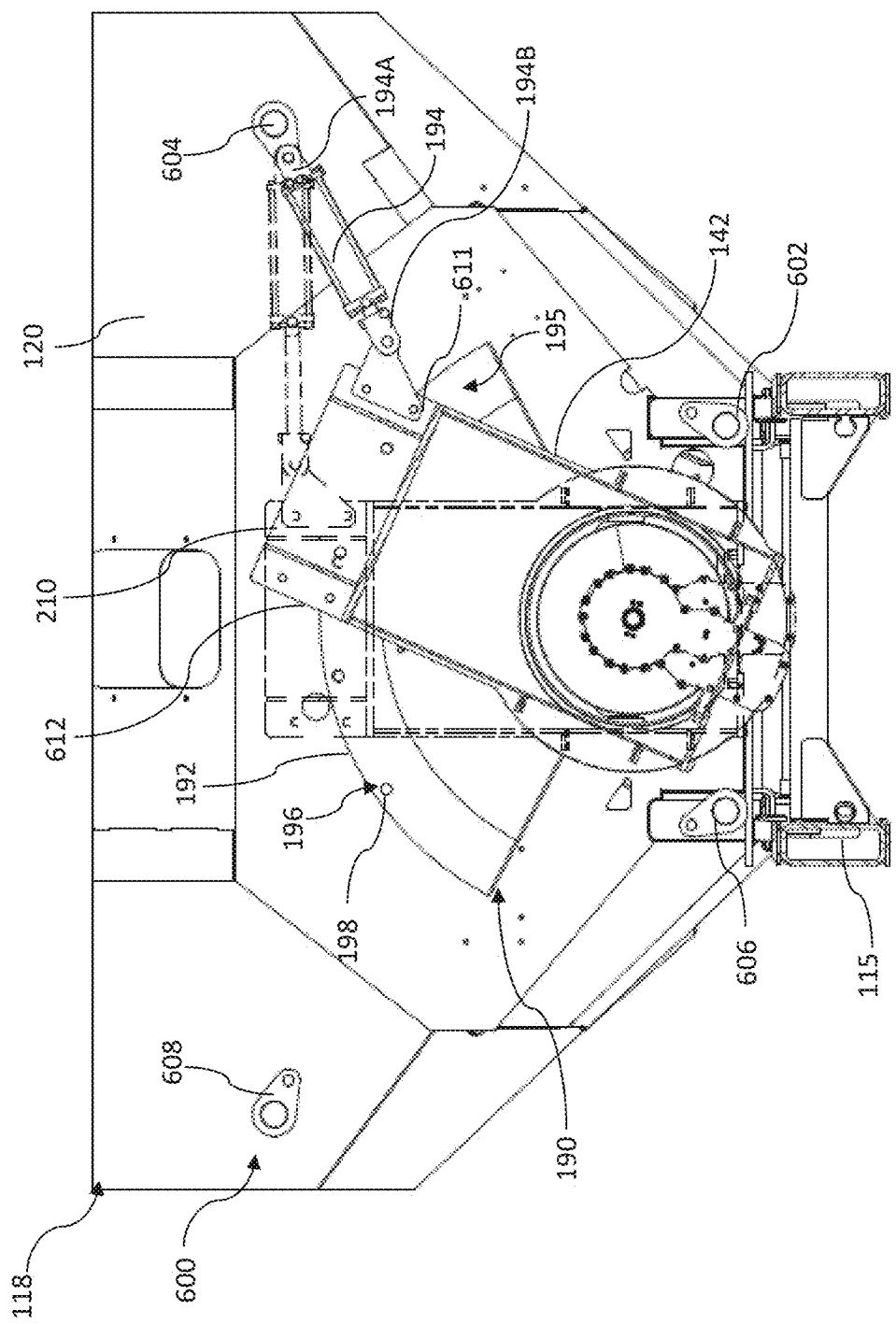
FIG. 7 is a detailed front view of a grain cart having a dual auger assembly with an intake housing moving from a first higher operating position to an idle operating position according to an exemplary embodiment. The vertical auger assembly is removed from the drawing for clarity purposes.

FIG. 7 shows a front view of the grain cart 100, where the intake housing 142 is moving from the first higher operating position (represented by solid line) to an idle operating position (represented by dashed lines). As shown in FIG. 7, the slide actuator 194 may be removably coupled to the first upper lug 604 and the first side 611 of the rail follower 210.

For example, the first end 194A of the slide actuator 194 may be coupled to the first upper lug 604, and the second end 194B of the slide actuator 194 may be coupled to the first side 611 of the rail follower 210. When coupled to the first upper lug 604 and the first side 611 of the rail follower 210, the slide actuator 194 extends above the intake housing 142 and is configured to move the vertical auger assembly 140 from a first operating position (e.g., the first higher operating position) to one or more idle operating position disposed along the non-unloading range 540 by extending or retracting the second end 194B. For example, as shown in FIG. 7, when coupled to the first upper lug 604 and the first side 611 of the rail follower 210, the slide actuator 194 may move the vertical auger assembly 140 from the first higher operating position to an idle operating position where the vertical auger assembly 140 extends substantially upright with respect to the ground. As shown in FIG. 7, the slide actuator 194 is represented by solid lines when set in a contracted state and dashed-lines when set in an extended state.

Figure 8:
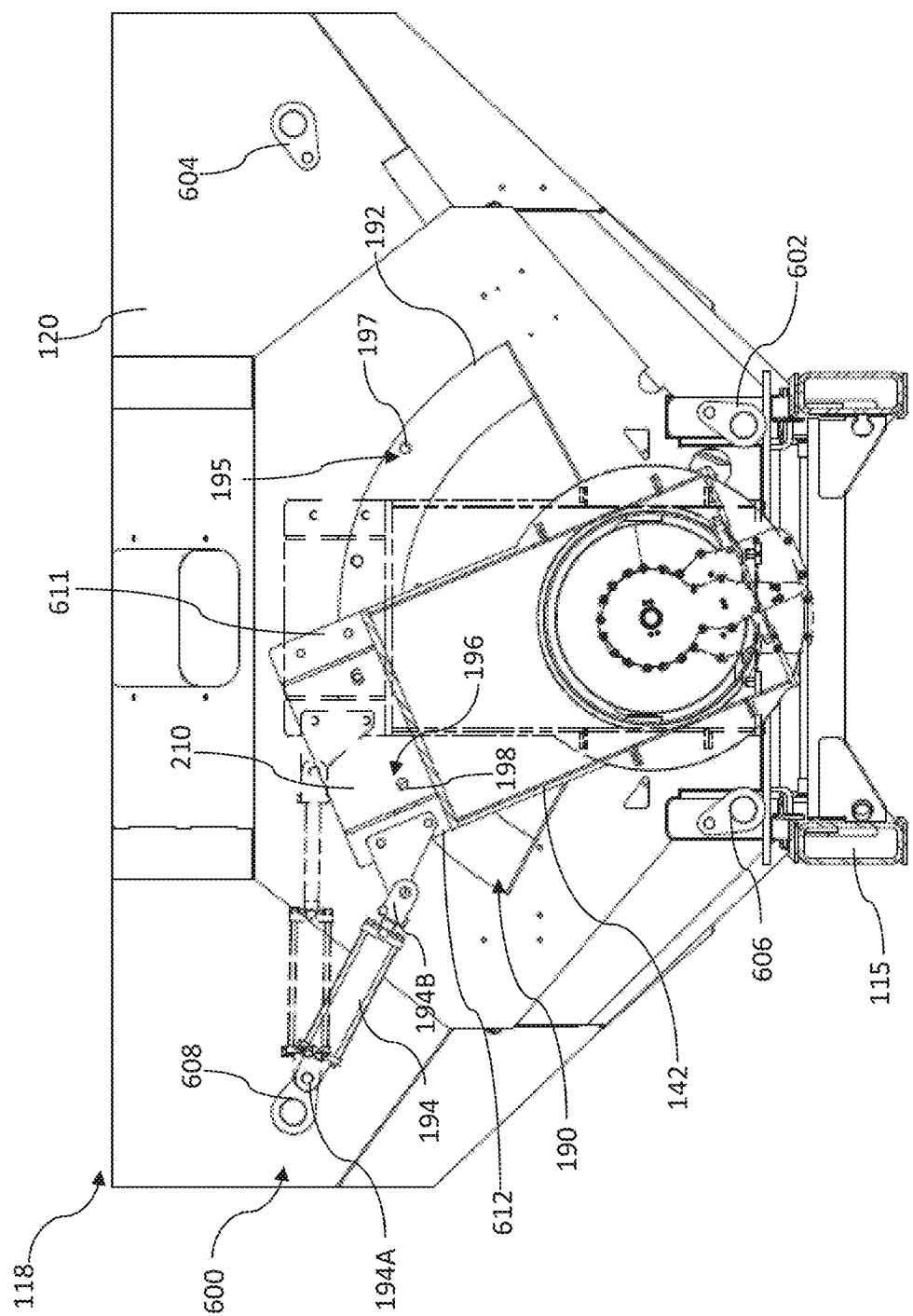
FIG. 8 is a detailed front view of a grain cart having a dual auger assembly with an intake housing moving from an idle operating to a second higher operating position according to an exemplary embodiment. The vertical auger assembly is removed from the drawing for clarity purposes.

FIG. 8 shows a front view of the grain cart 100, where the intake housing 142 is moving from the idle operating position (represented by dashed lines) to a second higher operating position (represented by solid lines). As shown in FIG. 8, the slide actuator 194 may be removably coupled to the second upper lug 608 and a second side 612 of the rail follower 210. For example, the first end 194A of the slide actuator 194 may be coupled to the second upper lug 608, and the second end 194B of the slide actuator 194 may be coupled to the second side 612 of the rail follower 210. When coupled to the second upper lug 608 and the second side 612 of the rail follower 210, the slide actuator 194 extends above the intake housing 142 and is configured to move the vertical auger assembly 140 from a second operating position (e.g., the second higher operating position) to one or more idle operating positions disposed along the non-unloading range 540 by extending or retracting the second end 194B. For example, as shown in FIG. 8, when coupled to the second upper lug 608 and the second side 612 of the rail follower 210, the slide actuator 194 may move the vertical auger assembly 140 from the idle operating position where the vertical auger assembly 140 extends substantially upright with respect to the ground to the second higher operating position disposed along the second unloading range 530, whereby the second higher operating position corresponds to the highest position of the vertical auger assembly 140 along the second unloading range 530. As shown in FIG. 8, the slide actuator 194 is represented by solid lines when set in a contracted state and dashed-lines when set in an extended state.

Figure 9:
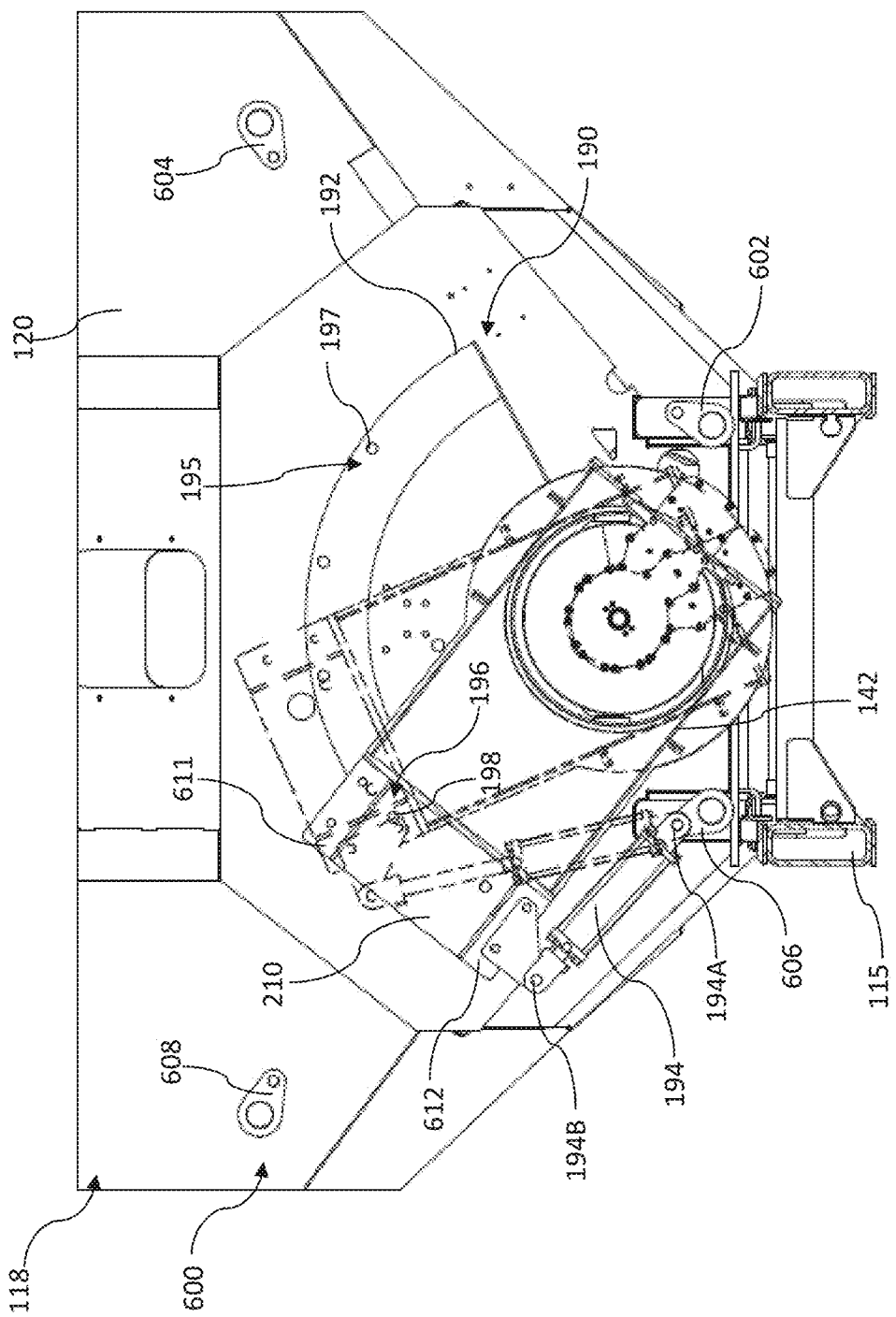
FIG. 9 is a detailed front view of a grain cart having a dual auger assembly with an intake housing moving from a second lower operating position to a second higher operating position according to an exemplary embodiment. The vertical auger assembly is removed from the drawing for clarity purposes.

FIG. 9 shows a front view of the grain cart 100, where the intake housing 142 is moving from the second higher operating position (represented by dashed lines) to a second lower operating position (represented by solid lines). As shown in FIG. 9, the slide actuator 194 may be removably coupled to the second lower lug 606 and the second side 612 of the rail follower 210. For example, the first end 194A of the slide actuator 194 may be coupled to the second lower lug 606, and the second end 194B of the slide actuator 194 may be coupled to the second side 612 of the rail follower 210. When coupled to the second lower lug 608 and the second side 612 of the rail follower 210, the slide actuator 194 extends below the vertical auger assembly 140 and is configured to move the vertical auger assembly 140 to one or more operating positions disposed along the second unloading range 530 by extending or retracting the second end 194B. For example, as shown in FIG. 9, when coupled to the second lower lug 608 and the second side 612 of the rail follower 210, the slide actuator 194 may move the vertical auger assembly 140 from the second higher operating position disposed along the second unloading range 530 to a second lower operating position disposed along the second unloading range 530. As shown in FIG. 9, the slide actuator 194 is represented by solid lines when set in a contracted state and dashed-lines when set in an extended state.

Figure 10:
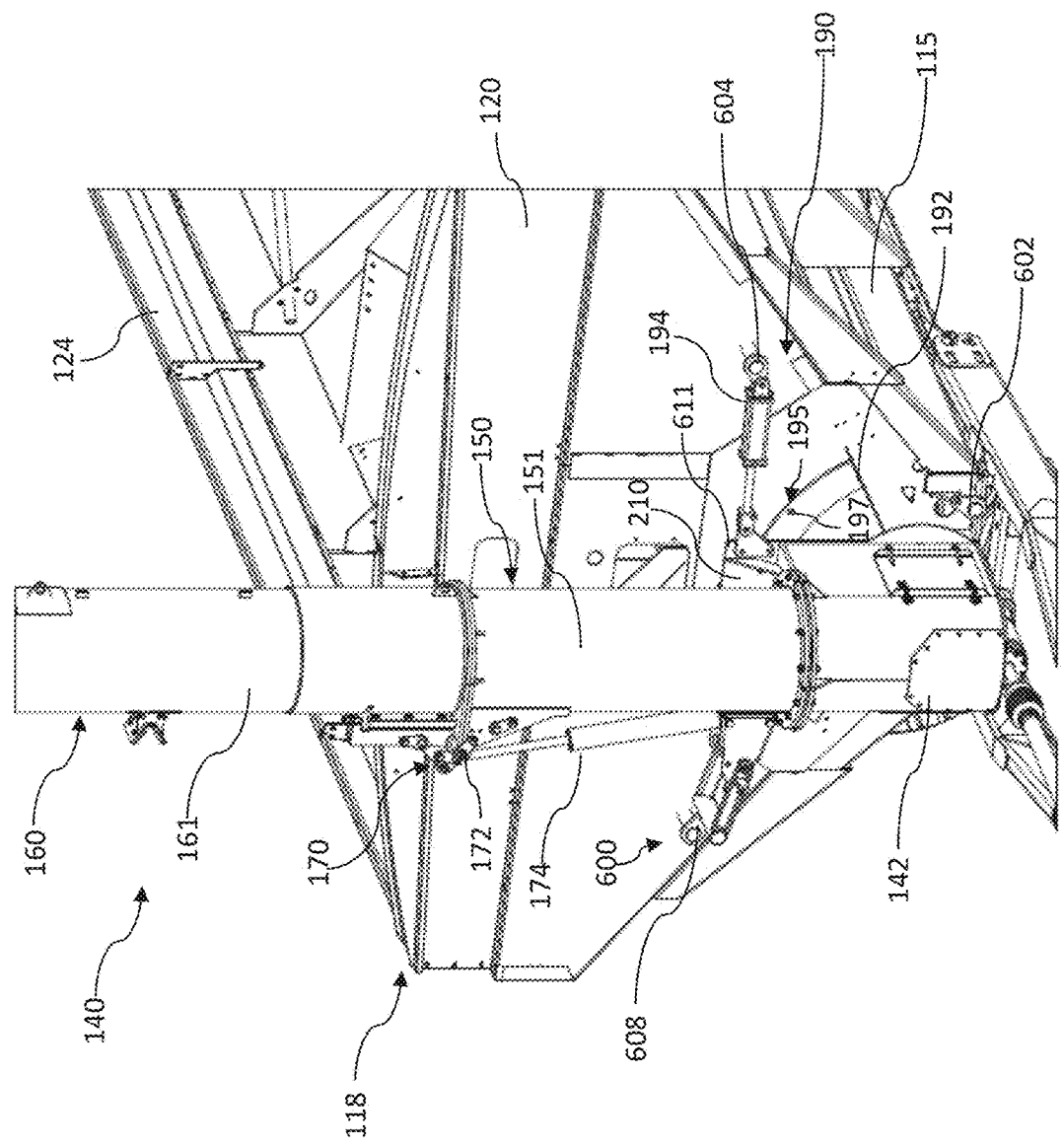
FIG. 10 is a detailed perspective view of a grain cart having a dual auger assembly with a vertical auger assembly set in an idle operating position and at a first angular position according to an exemplary embodiment.
Figure 11:
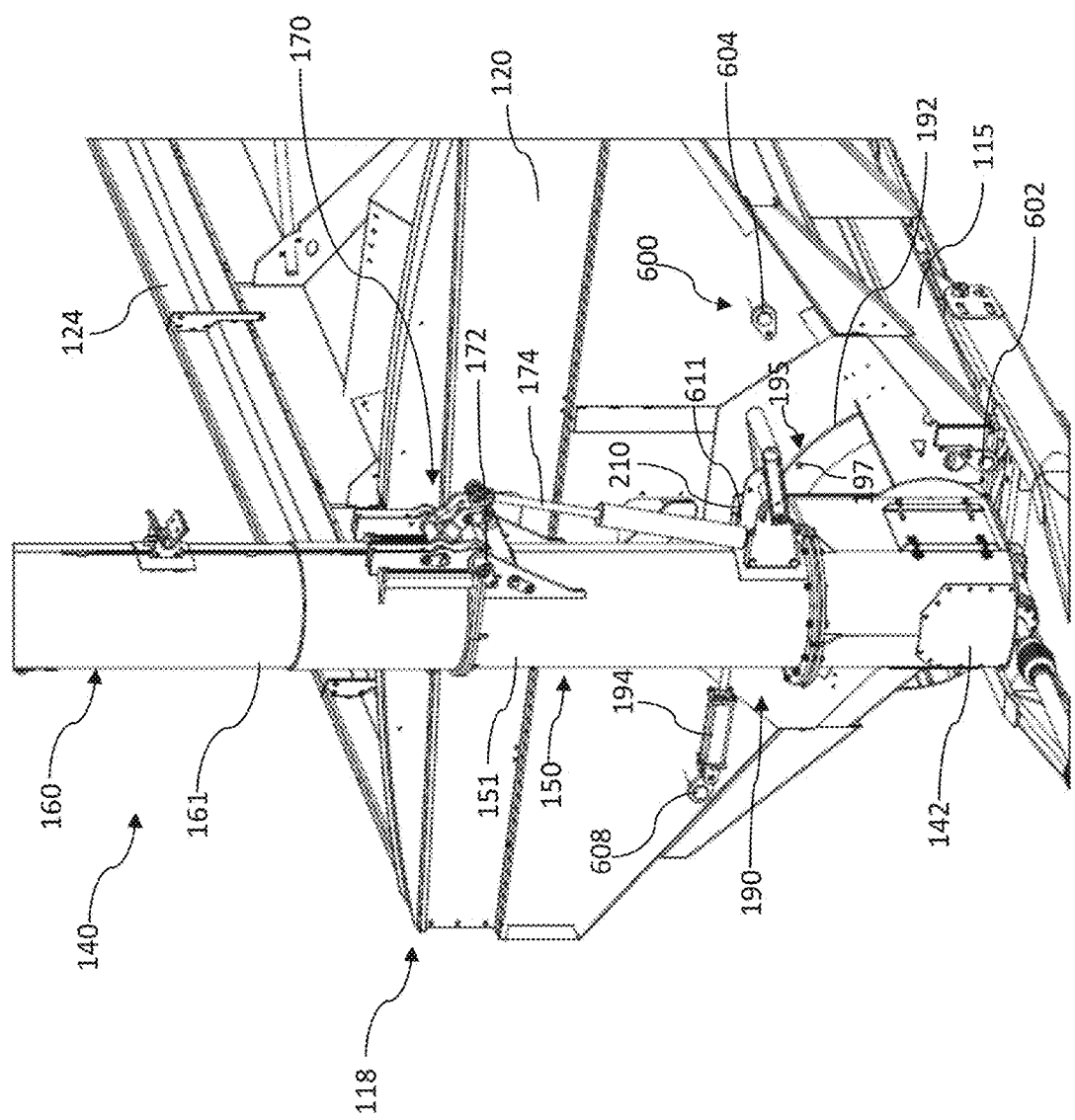
FIG. 11 is a detailed perspective view of a grain cart having a dual auger assembly with a vertical auger assembly set in an idle operating position and at a second angular position according to an exemplary embodiment.

As shown in FIGS. 10 and 11, at the idle operating position, the vertical auger assembly 140 may rotate about centerline of the lower and upper auger sections 150 and 160 so that the discharge portion 146 rotates from the first angular position, where the discharge portion 146 is pointed in the first direction, to the second angular position, where the discharge portion 146 is pointed in the second direction, opposite to the first direction.

Figure 12:
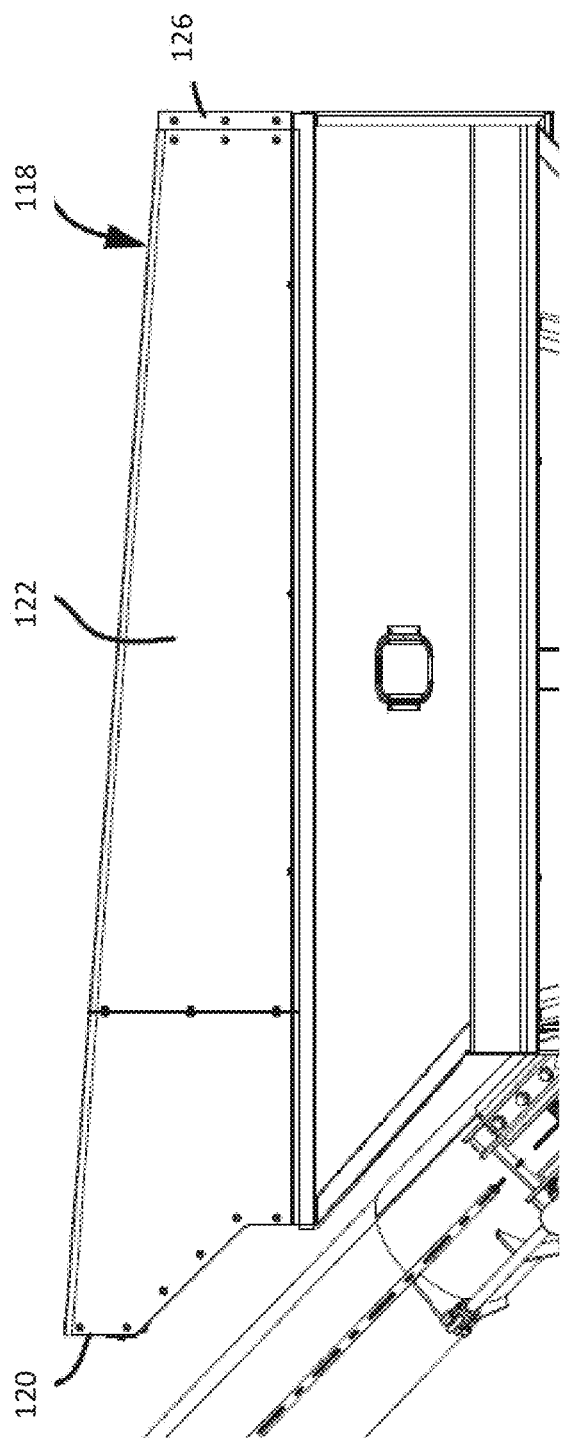
FIG. 12 illustrates an exemplary hopper, showing a front wall with an inclined portion.

FIG. 12 illustrates an exemplary hopper 118, showing a front wall 120 with an inclined portion. The variously described embodiments disclosed herein may include a hopper having a front wall with an inclined portion, such as shown in FIG. 12.

FIGS. 13-25 illustrate an alternative embodiment of a slide assembly 1310 and a lug assembly 1320 according to the present disclosure.

The slide assembly 1310 shown in FIGS. 13-25 includes the same or similar components of the slide assembly 190 shown in FIGS. 1-11, except that the slide assembly 1310 may include a slide rail 1312 that may be mounted along the front wall 120 on one of the first and second mounting assemblies 195 and 196, without being mounted to the other one of the first and second mounting assemblies 195 and 196. The slide rail 1312 defines a second range of pivoting by the vertical auger assembly 140 along the first plane parallel to the front wall 120 or extending transverse to frame 115 that is less than the first range of pivoting defined by the slide rail 192 shown in FIG. 1. In some embodiments, the second range of pivoting defined by the slide rail 1312 encompasses only the degree of one of the first and second unloading ranges 520 and 530, such that the vertical auger assembly 140 may only move within one of the first and second unloading ranges 520 and 530 when sliding along the slide rail 1312 at a respective mounting position. For example, the second range of pivoting defined by the slide rail 1312 ranges from about 30° to 70° along the first plane relative to an horizontal axis extending transverse to the longitudinal axis of the horizontal auger shaft 132.

The lug assembly 1320 shown in FIGS. 13-25 includes the same or similar components of the lug assembly 600 shown in FIGS. 6-12, except that the lug assembly 600 may include: a first container support member 1322 disposed along the first side of the hopper 118 proximate to the front wall 120, whereby the first lower lug 602 is disposed along the first container support member 1322; a second container support member 1324 disposed along the second side of the hopper 118 proximate to the front wall 120, whereby the second lower lug 606 is disposed along the second container support member 1324; and a central upper lug 1326 disposed about a central position along the front wall 120. In some embodiments, the central upper lug 1326 is a cylindrical-shaped projection that defines a hole configured to receive the locking member, such that the vertical auger assembly 140 may be selectively secured to the central upper lug 1326 at an idle operating position.

FIGS. 13-25 illustrate an exemplary operation of using the slide assembly 1310 to move the vertical auger assembly 140 from a first lower operating position disposed along the first unloading range 520, where the vertical auger assembly 140 is configured to discharge agricultural material about the first side of the hopper 118, to a second lower operating position disposed along the second unloading range 530, where the vertical auger assembly 140 is configured to discharge agricultural material about the second side of the hopper 118. In operation, the slide rail 1312 may be moved between a first mounting position and a second mounting position, and the slide actuator 194 may be removably coupled to the rail follower 210 and at least one of the lugs 602-608 to move the vertical auger assembly 140 to at least one of the operating positions.

FIGS. 13-16 show the vertical auger assembly 140 disposed along the first unloading range 520, whereby the vertical auger assembly 140 is configured to discharge agricultural material about the first side of the hopper 118

Figure 13:
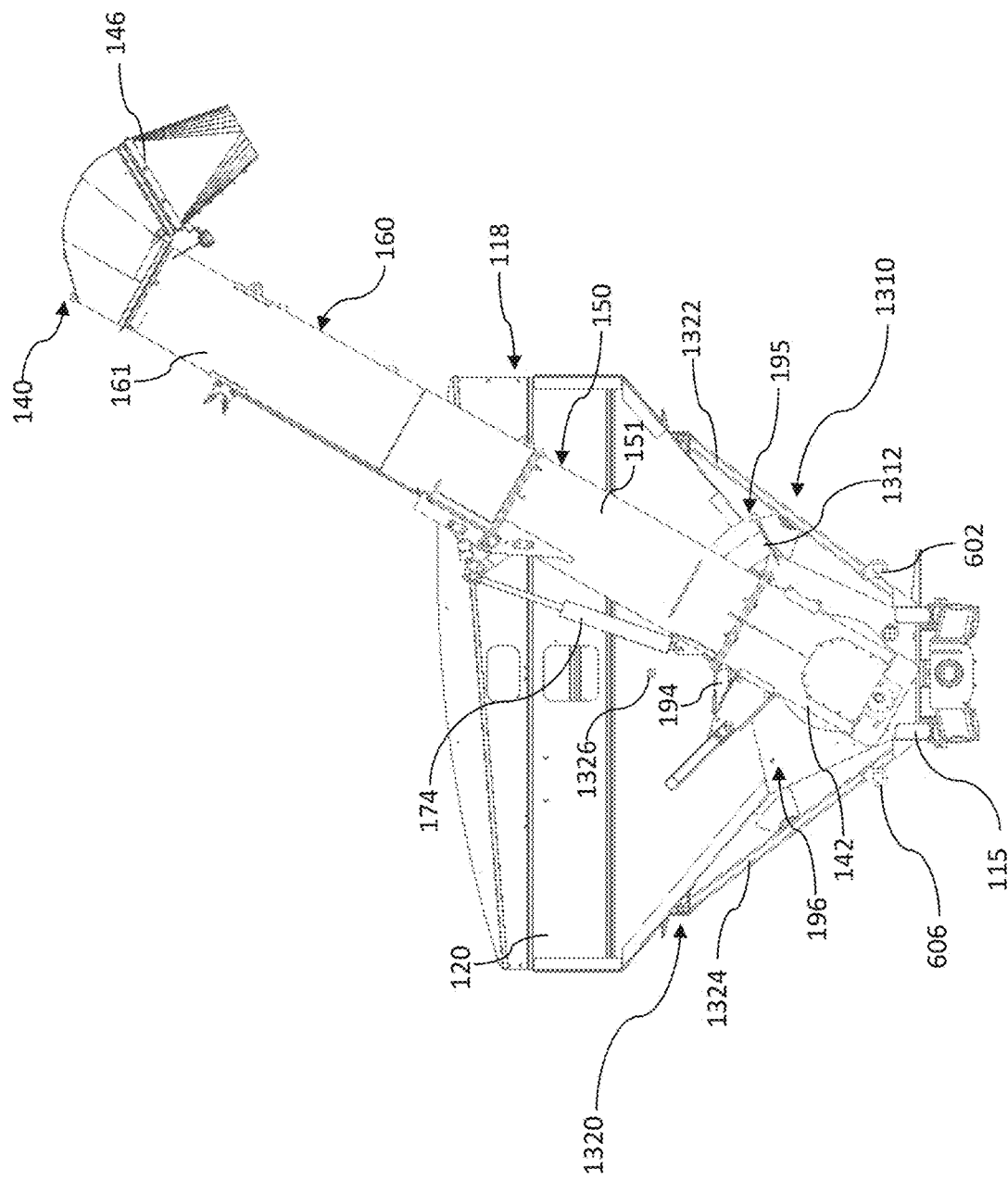
FIG. 13 is a front view of a grain cart having a dual auger assembly with a vertical auger assembly set at a first operating position and a slide rail mounted to the front wall at a first mounting position according to an exemplary embodiment.
Figure 14:
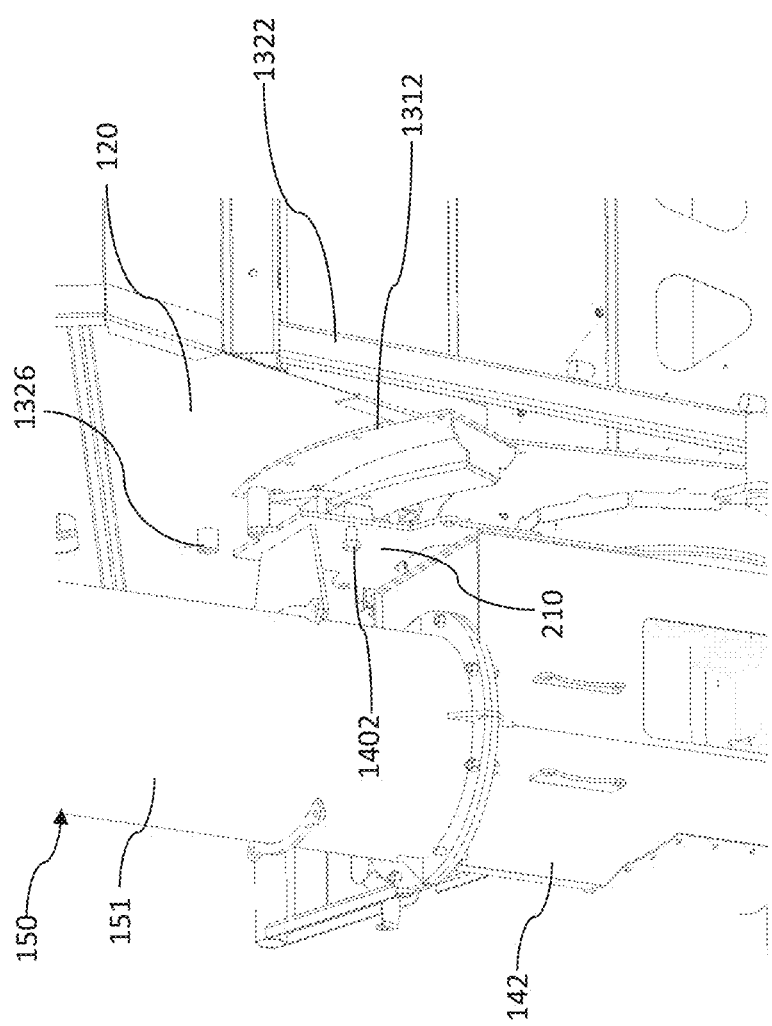
FIG. 14 is a detailed perspective view of a grain cart having a dual auger assembly with a vertical auger assembly set at a first operating position and a slide rail mounted to the front wall at a first mounting position according to an exemplary embodiment.
Figure 15:
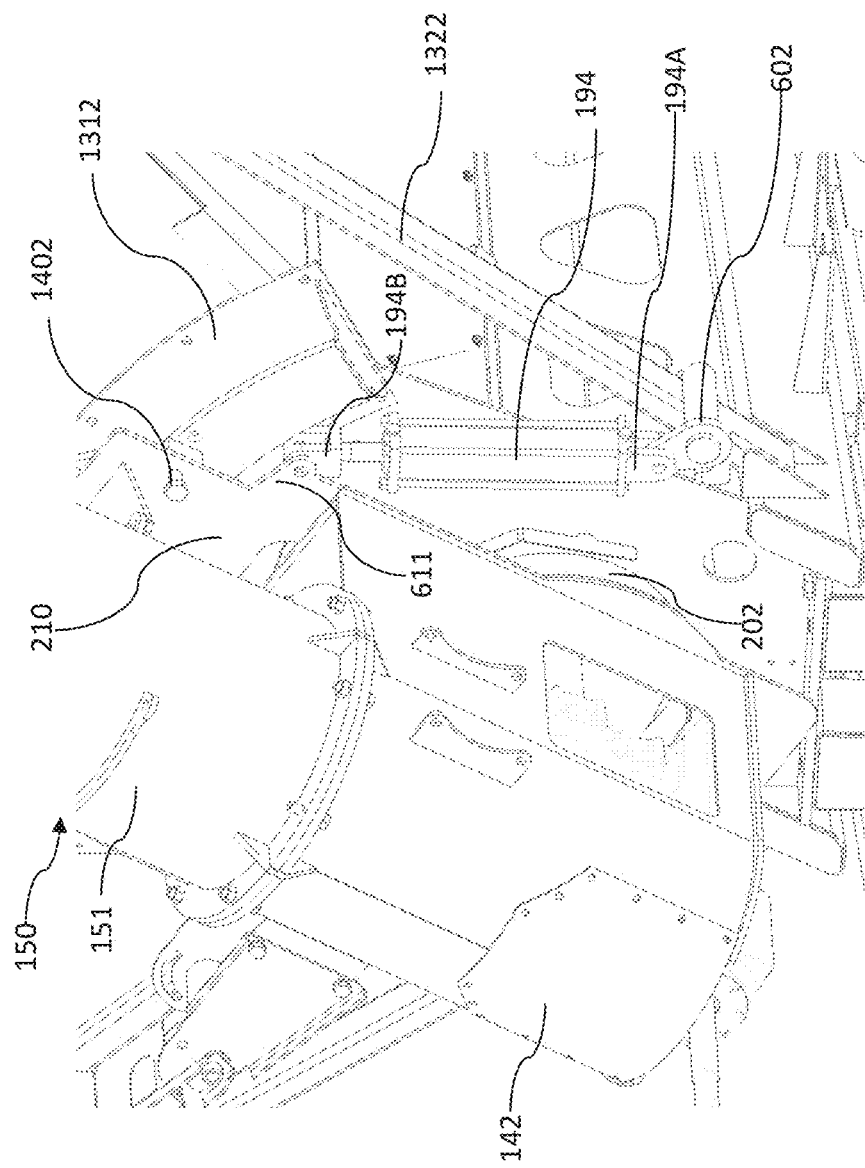
FIG. 15 is a detailed perspective view of a grain cart having a dual auger assembly with a vertical auger assembly, a slide rail mounted to the front wall at a first mounting position, and a slide actuator coupled to a first lower lug according to an exemplary embodiment.

As shown in FIGS. 13-15, the slide rail 1312 may be mounted on the first mounting assembly 195 at a first mounting position along the front wall 120, without being mounted to the second mounting assembly 196. When mounted on the first mounting assembly 195 at the first mounting position, the slide rail 1312 defines a range of pivoting by the vertical auger assembly 140 along a plane extending transverse to the frame 115 or parallel to the front wall 120 that corresponds to the first unloading range 520.

Referring to FIG. 13, the slide actuator 194 may be removably coupled to the second upper lug 608 and the second side 612 of the rail follower 210. For example, the first end 194A of the slide actuator 194 may be coupled to the second upper lug 608, and the second end 194B of the slide actuator 194 may be coupled to the second side 612 of the rail follower 210 (not shown). When coupled to the second upper lug 608 and the second side 612 of the rail follower 210, the slide actuator 194 extends above the intake housing 142 and is configured to move the vertical auger assembly 140 to one or more positions disposed along the first unloading range 520 by extending or retracting the second end 194B. For example, as shown in FIG. 13, when coupled to second upper lug 608 and the second side of the rail follower 210, the slide actuator 194 may move the vertical auger assembly 140 from a first lower operating position disposed along the first unloading range 520 to a first higher operating position disposed along the first unloading range 520.

As shown in FIG. 14, the vertical auger assembly 140 may be mounted to the slide rail 1312 before moving the slide actuator 194, the slide rail 1312, and the vertical auger assembly 140 to other positions. For example, the vertical auger assembly 140 may be mounted to the slide rail 1312 by inserting a locking member 1402 through the rail follower 210 and the slide rail 1312, thereby preventing the vertical auger assembly 140 from pivoting along slide rail 1312.

As shown in FIG. 15, slide actuator 194 may be moved to the other side of the vertical auger assembly 140, where the slide actuator 194 is removably coupled to the first lower lug 602 and the first side 611 of the rail follower 210. For example, the first end 194A of the slide actuator 194 may be coupled to the first lower lug 602, and the second end 194B of the slide actuator 194 may be coupled to the first side 611 of the rail follower 210. When coupled to the first lower lug 602 and the first side 611 of the rail follower 210, the slide actuator 194 extends below the vertical auger assembly 140 and is configured to move the vertical auger assembly 140 from a first operating position (e.g., the first higher operating position) to one or more idle operating position disposed along the non-unloading range 540 by extending or retracting the second end 194B. For example, as shown in FIG. 17, when coupled to the first lower lug 602 and the first side (not shown) of the rail follower 210, the slide actuator 194 may move the vertical auger assembly 140 from the first higher operating position to an idle operating position where the vertical auger assembly 140 extends substantially upright with respect to the ground.

Figure 16:
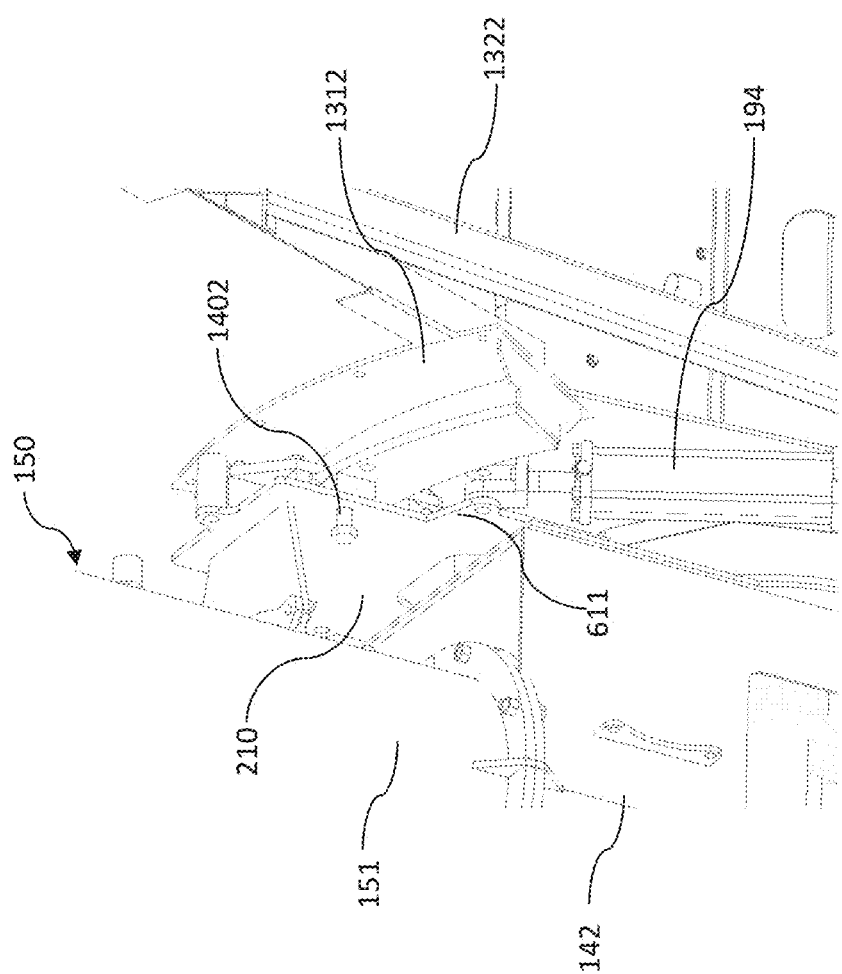
FIG. 16 is a detailed perspective view of a grain cart having a dual auger assembly with a vertical auger assembly and a slide rail according to an exemplary embodiment.

Referring to FIG. 16, the slide rail 1312 may be detached from the front wall 120 so that the slide rail 1312 may move to another mounting position. In some embodiments, as the vertical auger assembly 140 moves from the first higher operating position to an idle operating position, the slide rail 1312 may be hanging from the rail follower 210. In some embodiments, the locking member 1402 may be removed from the rail follower 210 and the slide rail 1312 before the process of detaching the slide rail 1312.

Figure 17:
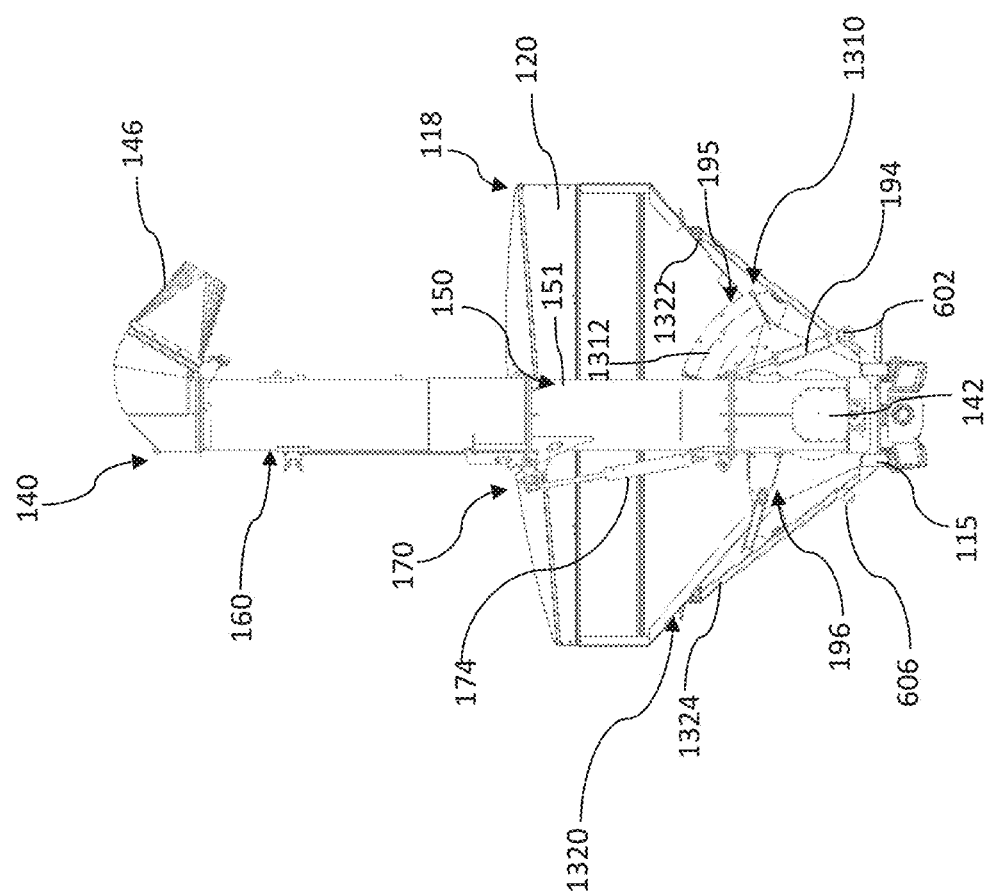
FIG. 17 is a front view of a grain cart having a dual auger assembly with a vertical auger assembly set at an idle operating position and a discharge portion set a first angular position according to an exemplary embodiment.
Figure 18:
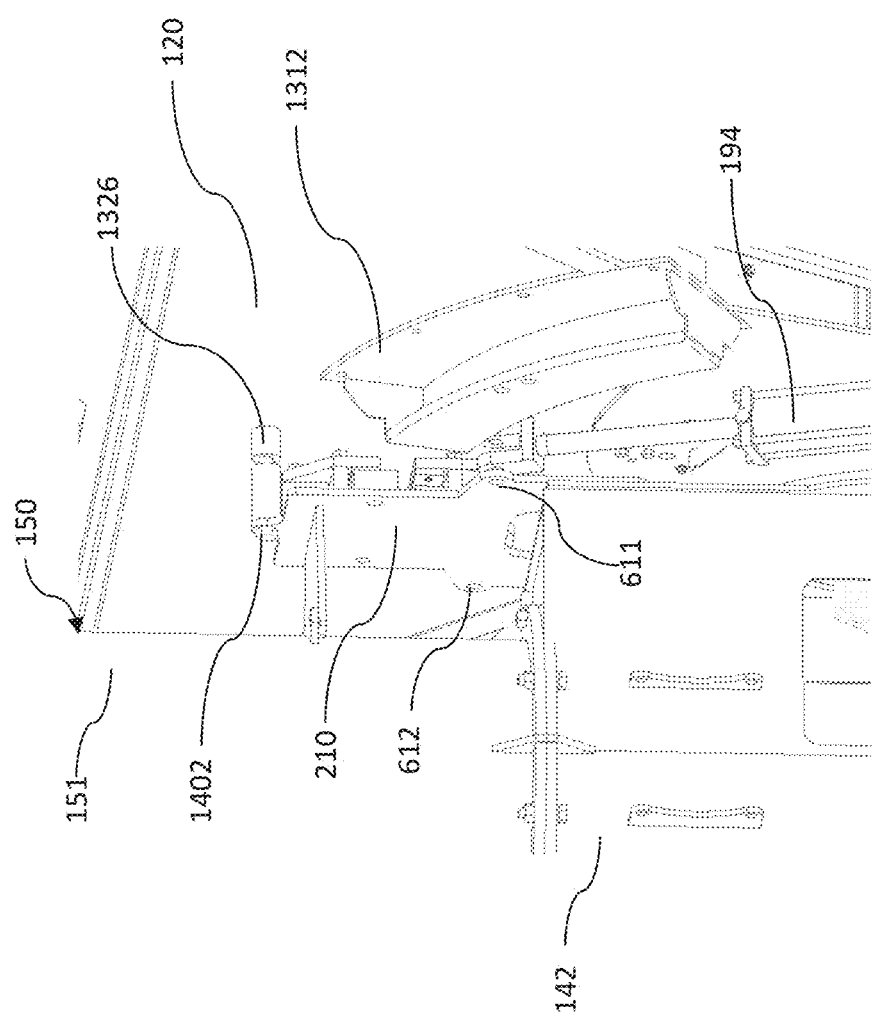
FIG. 18 is a detailed perspective view of a grain cart having a dual auger assembly with a vertical auger assembly set at an idle operating position and mounted to the front wall according to an exemplary embodiment.
Figure 19:
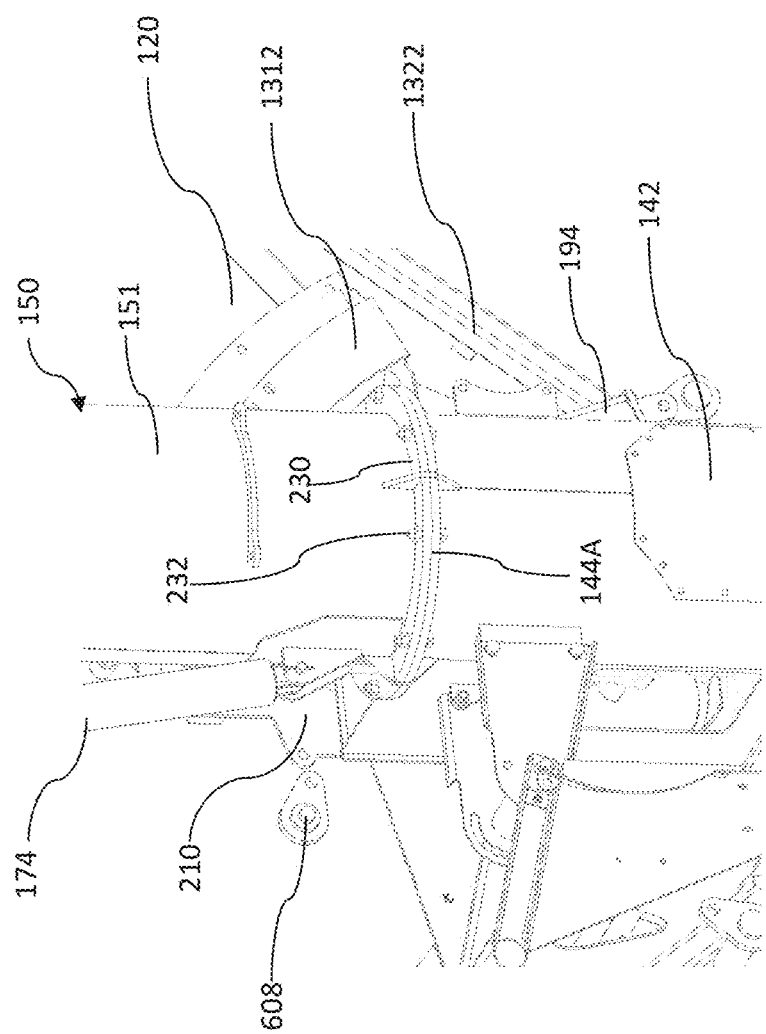
FIG. 19 is a detailed perspective view of a grain cart having a dual auger assembly with a vertical auger assembly set at an idle operating position and mounted to the front wall according to an exemplary embodiment.
Figure 20:
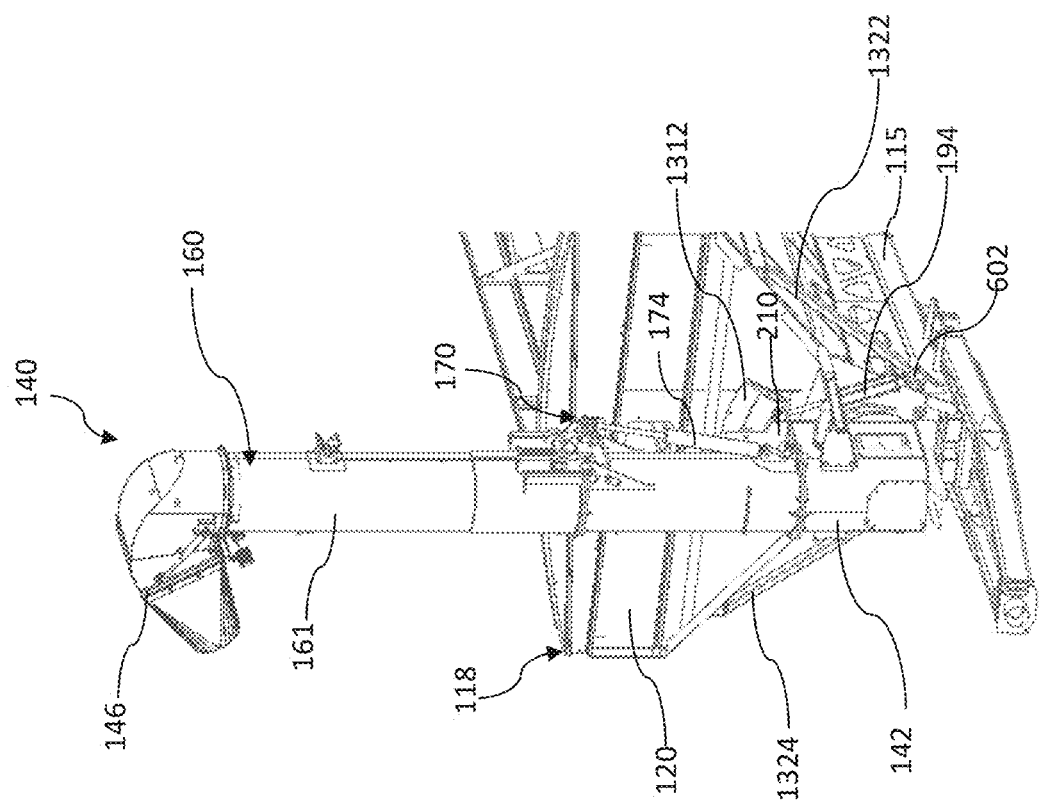
FIG. 20 is a detailed perspective view of a grain cart having a dual auger assembly with a vertical auger assembly set at an idle operating position and with a discharge portion set at a second angular position according to an exemplary embodiment.

FIGS. 17-22 show the vertical auger assembly 140 moved to the idle operating position disposed along the non-unloading range 540, whereby the vertical auger assembly 140 extends substantially upright with respect to the ground. As shown in FIG. 17, the discharge portion 146 is set at the first angular position facing away from the intake housing 142 and the lower and upper auger housings 151, 161 in the first direction. As shown in FIG. 20, the discharge portion 146 is set at the second angular position facing away from the intake housing 142 and the lower and upper auger housings 151, 161 in the second direction, opposite to the first direction.

As shown in FIG. 18, once the vertical auger assembly 140 reaches the idle operating position, the vertical auger assembly 140 may be mounted to the front wall 120 by inserting the locking member 1402 through the rail follower 210 and into the central upper lug 1326.

Referring to FIGS. 19 and 20, the auger housing fasteners 232 inserted through the flange 230 of the lower auger housing 151 and the outlet 144A of the intake housing 142 may be removed so that the vertical auger assembly 140 may rotate on the outlet 144A to adjust the angular position of the discharge portion 146. In some embodiments, a first set of auger housing fasteners 232 may be removed from the flange 230 of the lower auger housing 151, and a second set of auger housing fasteners 232 may remain in the flange 230 in a loosened state. For example, the vertical auger assembly 140 may be rotated from the first angular position, where the discharge portion 146 is pointed in the first direction, to the second angular position, where the discharge portion 146 is pointed in the second direction, opposite to the first direction. To secure the vertical auger assembly 140 at the second angular position, the auger housing fasteners 232 may be inserted through the flange 230 of the lower auger housing 151 and the outlet 144A of the intake housing 142.

Figure 21:
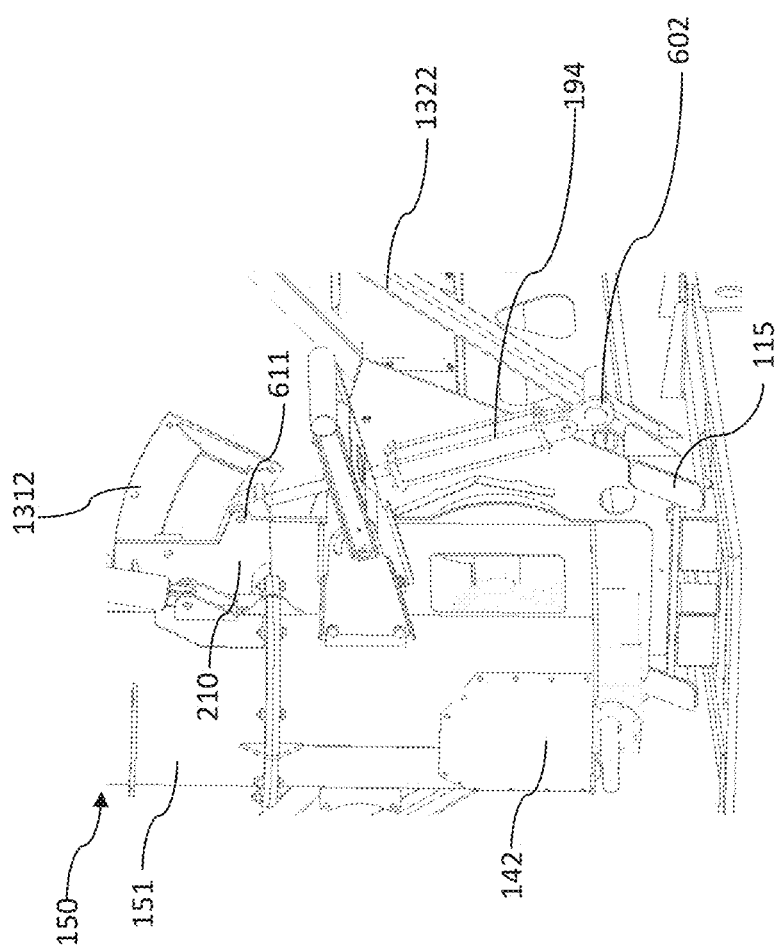
FIG. 21 is a detailed perspective view of a grain cart having a dual auger assembly with a vertical auger assembly set at an idle operating position and a slide actuator coupled to a first lower lug according to an exemplary embodiment.
Figure 22:
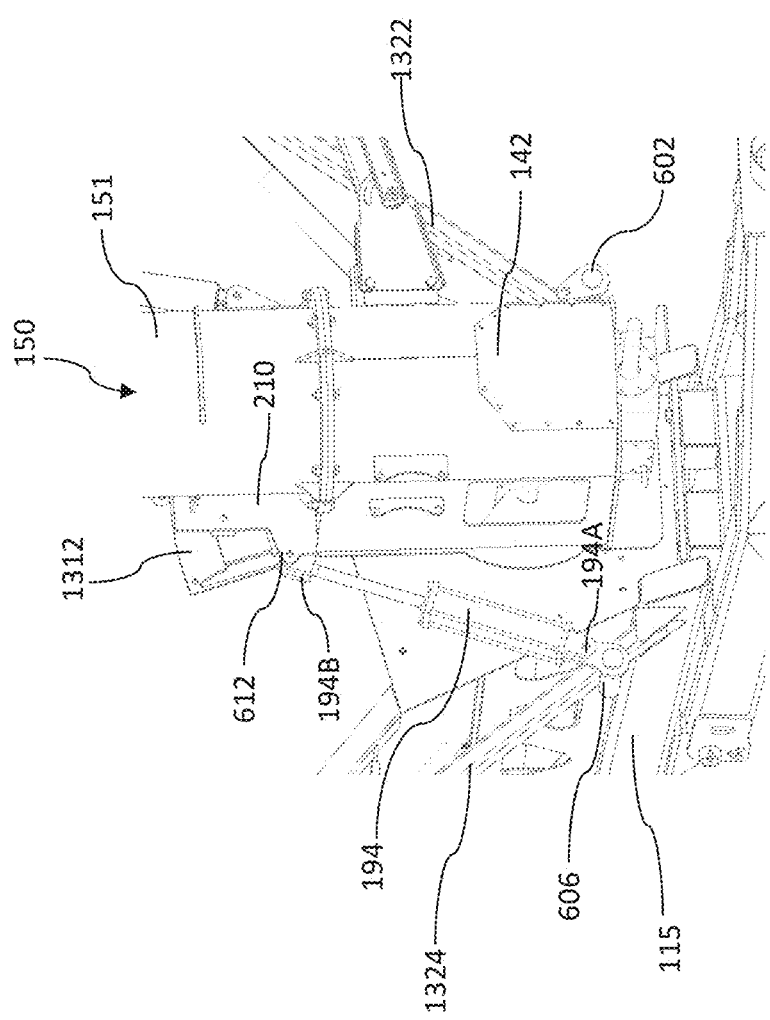
FIG. 22 is a detailed perspective view of a grain cart having a dual auger assembly with a vertical auger assembly set at an idle operating position and a slide actuator coupled to a second lower lug according to an exemplary embodiment.

As shown in FIGS. 21 and 22, the slide actuator 194 may be moved to the other side of the vertical auger assembly 140, where the slide actuator 194 is removably coupled to the second lower lug 606 and the second side 612 of the rail follower 210. For example, the first end 194A of the slide actuator 194 may be coupled to the second lower lug 606, and the second end 194B of the slide actuator 194 may be coupled to the second side 612 of the rail follower 210. When coupled to the second lower lug 606 and the second side 612 of the rail follower 210, the slide actuator 194 extends below the vertical auger assembly 140 and is configured to move the vertical auger assembly 140 from one or more idle operating position disposed along the non-unloading range 540 to a second operating position (e.g., the second higher operating position) disposed along the second unloading range 530 by extending or retracting the second end 194B. For example, as shown in FIG. 23, when coupled to the second lower lug 606 and the second side 612 of the rail follower 210, the slide actuator 194 may move the vertical auger assembly 140 from the idle operating position where the vertical auger assembly 140 extends substantially upright with respect to the ground to the second higher operating position disposed along the second unloading range 530.

In some embodiments, the vertical auger assembly 140 may be unsecured from the front wall 120 before moving the vertical auger assembly 140 from the idle operating position where the vertical auger assembly 140 extends substantially upright with respect to the ground to the second higher operating position disposed along the second unloading range 530. For example, the vertical auger assembly 140 may be unsecured by removing the locking member 1402 from the central upper lug 1326 and the rail follower 210.

Figure 23:
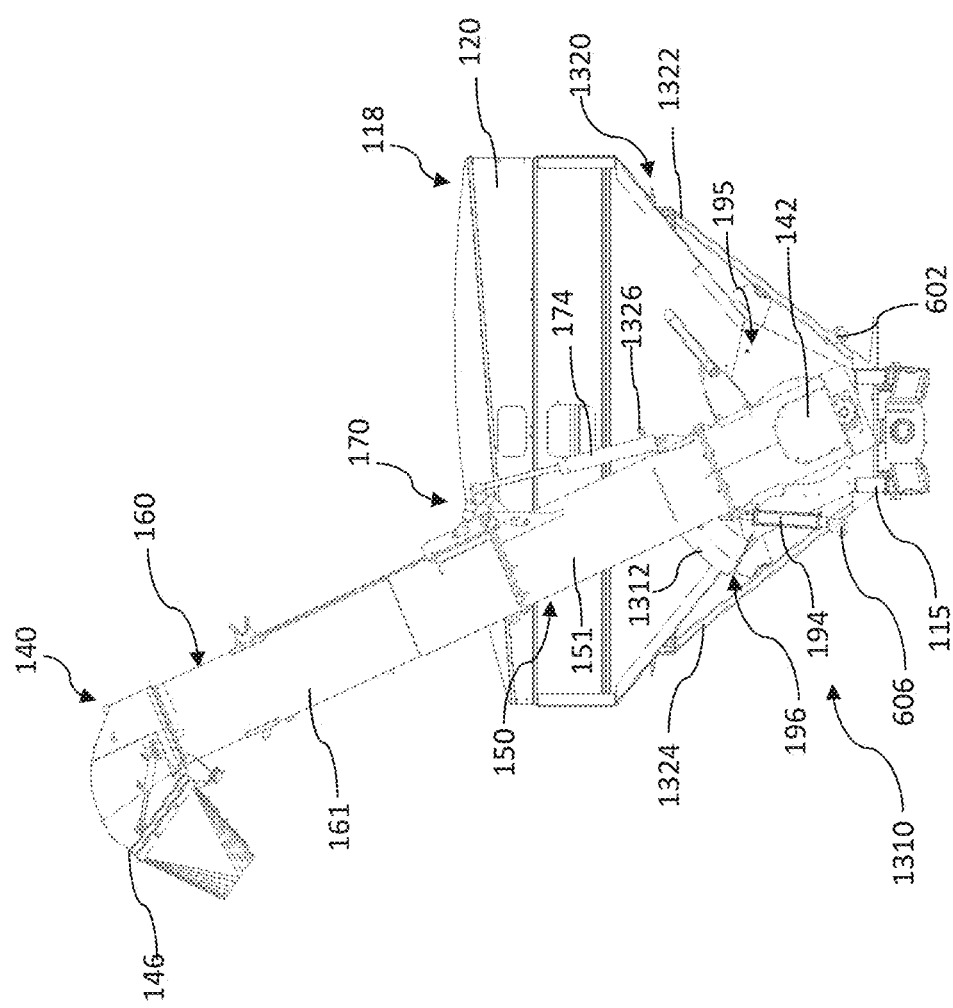
FIG. 23 is a front view of a grain cart having a dual auger assembly with a vertical auger assembly set at a second operating position and a slide rail mounted to the front wall at a second mounting position according to an exemplary embodiment.
Figure 24:
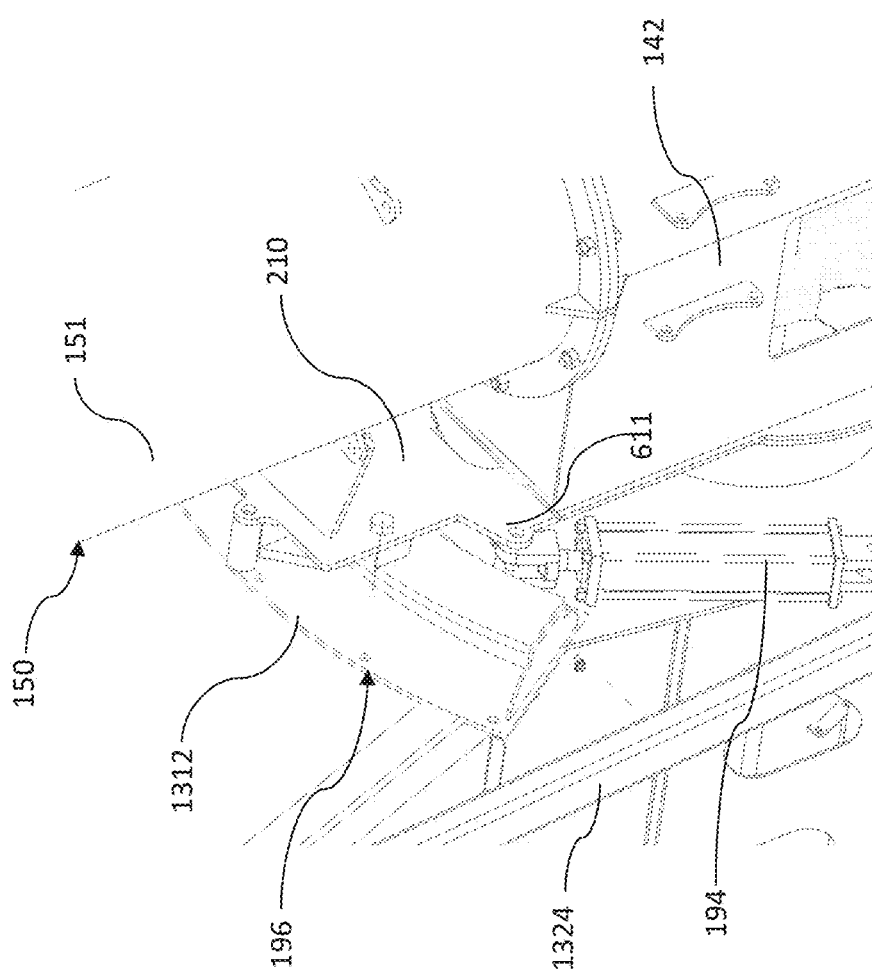
FIG. 24 is a detailed perspective view of a grain cart having a dual auger assembly with a vertical auger assembly set at a second operating position and a slide rail mounted to the front wall at a second mounting position according to an exemplary embodiment.
Figure 25:
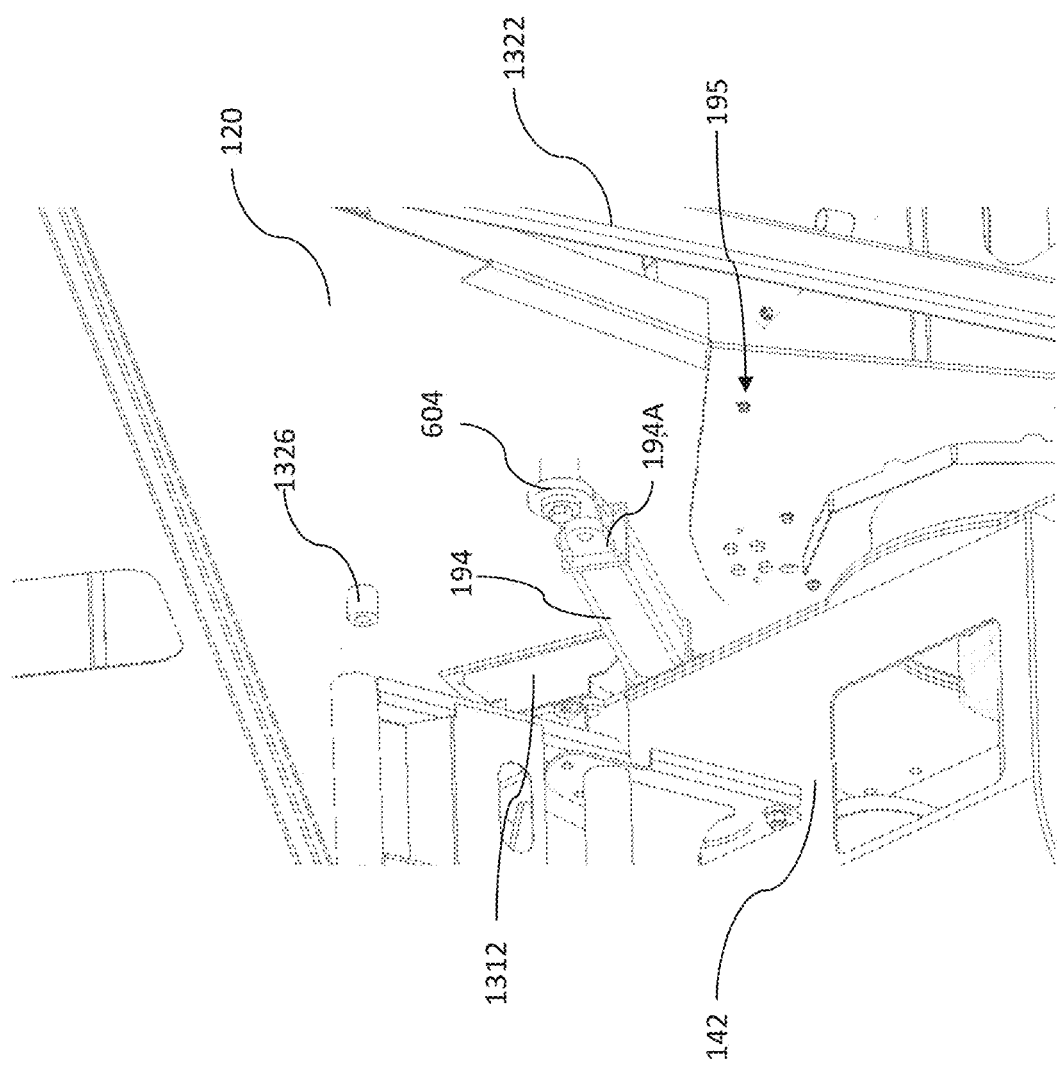
FIG. 25 is a detailed perspective view of a grain cart having a dual auger assembly with a vertical auger assembly set a second operating position, a slide rail mounted to the front wall at a second mounting position, and a slide actuator coupled to a first upper lug according to an exemplary embodiment.
Figure 26:
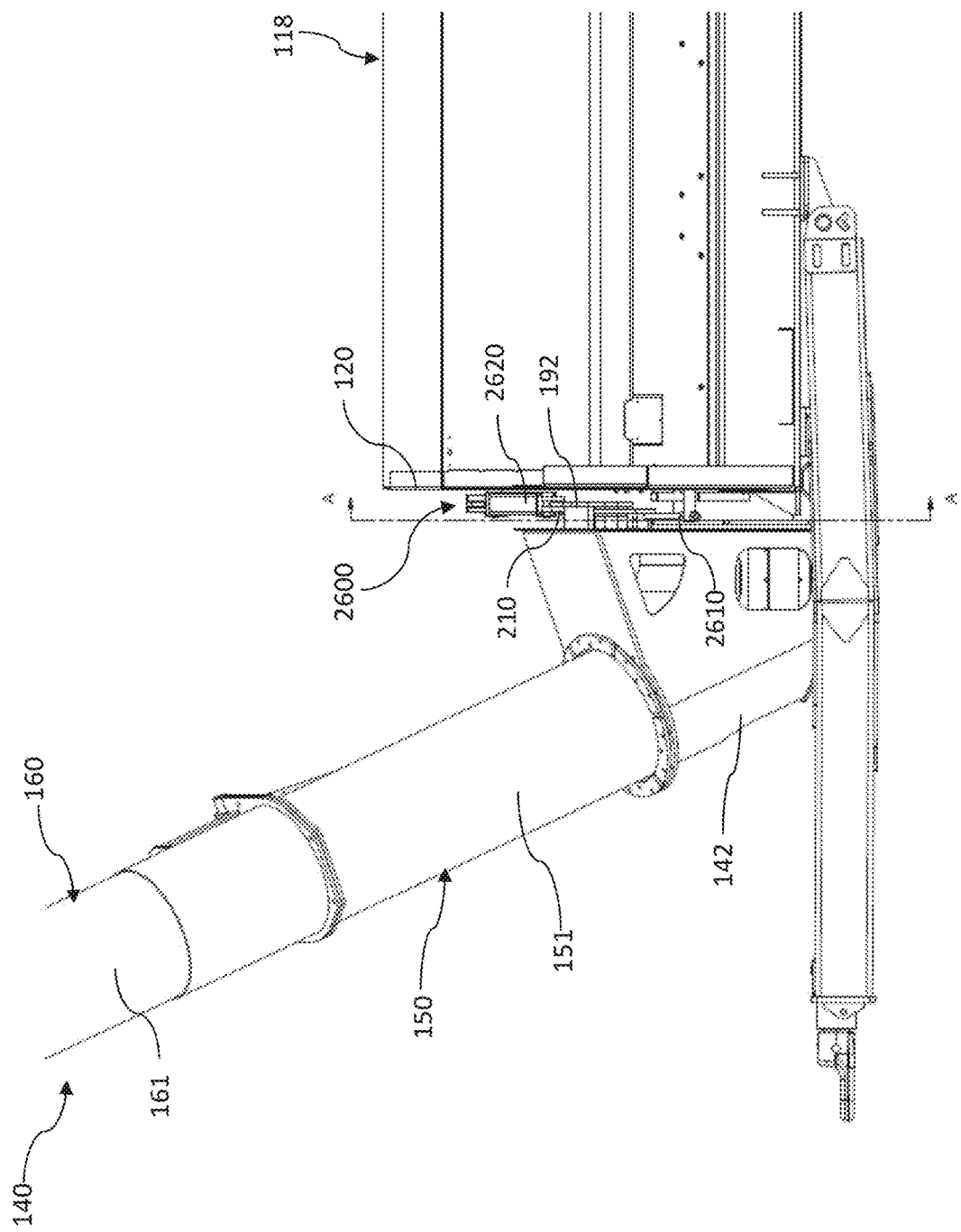
FIG. 26 is a detailed side view of a grain cart having a dual auger assembly with a vertical auger assembly set at a first operating position and a slide assembly having first and second actuators according to an exemplary embodiment.

FIGS. 23-25 show the vertical auger assembly 140 disposed along the second unloading range 530, whereby the vertical auger assembly 140 is configured to discharge agricultural material about the second side of the hopper 118.

As shown in FIGS. 23-25, the slide rail 1312 may be mounted on the second mounting assembly 196 at a second mounting position along the front wall 120, without being mounted to the first mounting assembly 195. When mounted on the second mounting assembly 196 at the second mounting position, the slide rail 1312 defines a range of pivoting by the vertical auger assembly 140 along a plane extending transverse to the frame 115 that corresponds to the first unloading range 530.

As shown in FIG. 25, the slide actuator 194 may be moved to the other side of the vertical auger assembly 140, where the slide actuator 194 is removably coupled to the first upper lug 604 and the first side 611 of the rail follower 210. For example, the first end 194A of the slide actuator 194 may be coupled to the first upper lug 604, and the second end 194B of the slide actuator 194 may be coupled to the first side 611 of the rail follower 210. When coupled to the first upper lug 604 and the first side 611 of the rail follower 210, the slide actuator 194 extends above the intake housing 142 and is configured to move the vertical auger assembly 140 to one or more positions disposed along the second unloading range 530 by extending or retracting the second end 194B. For example, when coupled to the first upper lug 604 and the first side 611 of the rail follower 210, the slide actuator 194 may move the vertical auger assembly 140 from the second higher operating position disposed along the second unloading range 530 to a lower operating position disposed along the second unloading range 530.

In some embodiments, the vertical auger assembly 140 may be mounted to the slide rail 1312, while moving the slide actuator 194 from one side of the vertical auger assembly 140 to the other side of the auger assembly 140. For example, the vertical auger assembly 140 may be mounted to the slide rail 1312 by inserting a locking member 1402 through the rail follower 210 and the slide rail 1312, thereby preventing the vertical auger assembly 140 from pivoting along slide rail 1312.

FIGS. 26-30 illustrate an alternative embodiment of a slide assembly 2600 and a lug assembly 2700 according to the present disclosure.

The slide assembly 2600 shown in FIGS. 26-30 may include the same or similar components of the slide assembly 190 shown in FIGS. 1-11, except that the slide assembly 2600 may include: (i) a first slide actuator 2610 configured to move the vertical auger assembly 140 from a first operating position (e.g., the first higher operating position) disposed along the first unloading range 520 to a second operating position (e.g., the second higher operating position) disposed along the second unloading range 530 and any position in between, such as one or more idle operating positions disposed along the non-unloading range 540; and (ii) a second slide actuator 2620 configured to move vertical auger assembly 140 to one or more operating positions along either the first or second unloading ranges 520 and 530.

Figure 27:
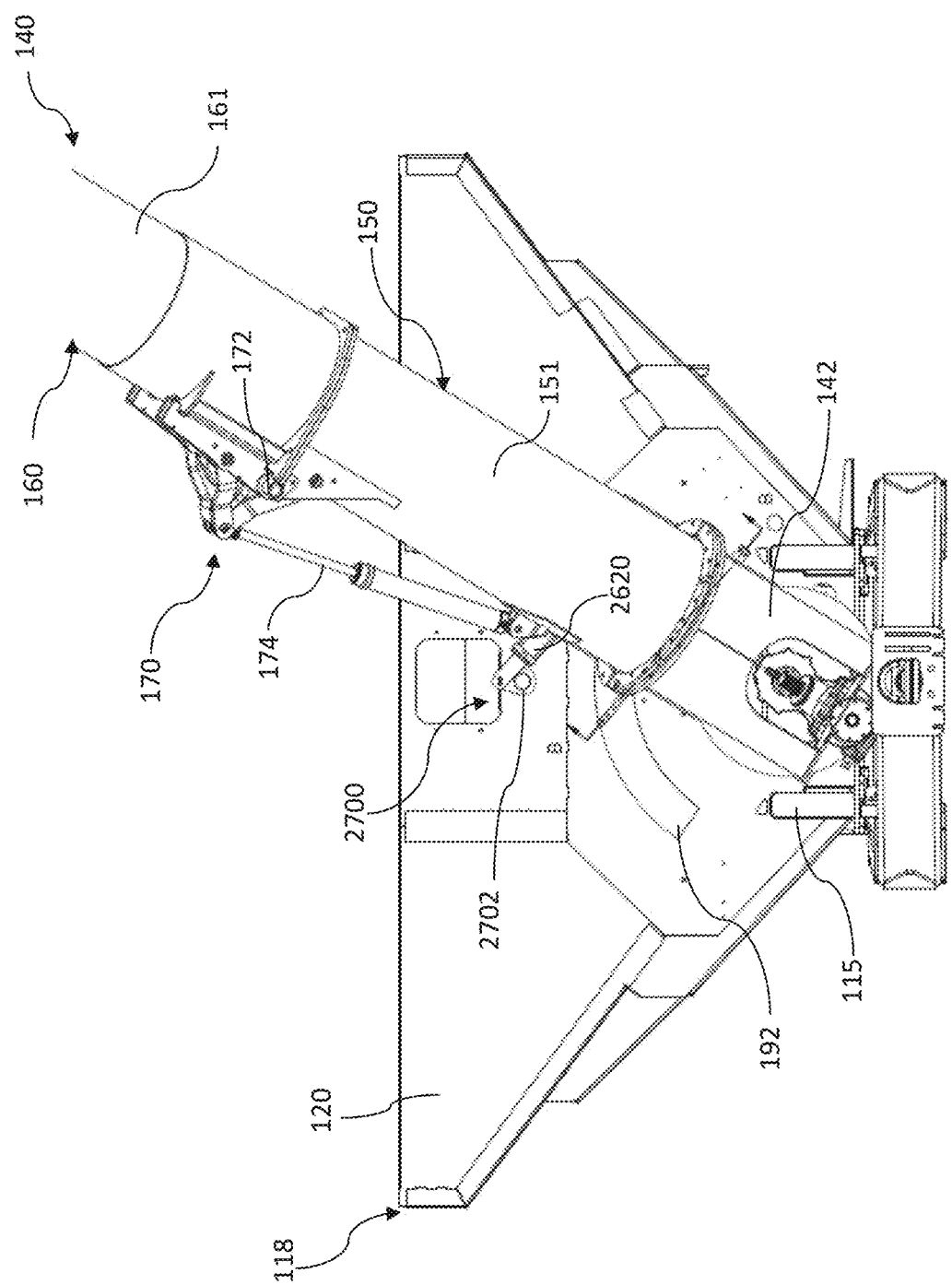
FIG. 27 is a detailed front view of a grain cart having a dual auger assembly with a vertical auger assembly set at a first operating position and a slide assembly having first and second actuators according to an exemplary embodiment.
Figure 29:
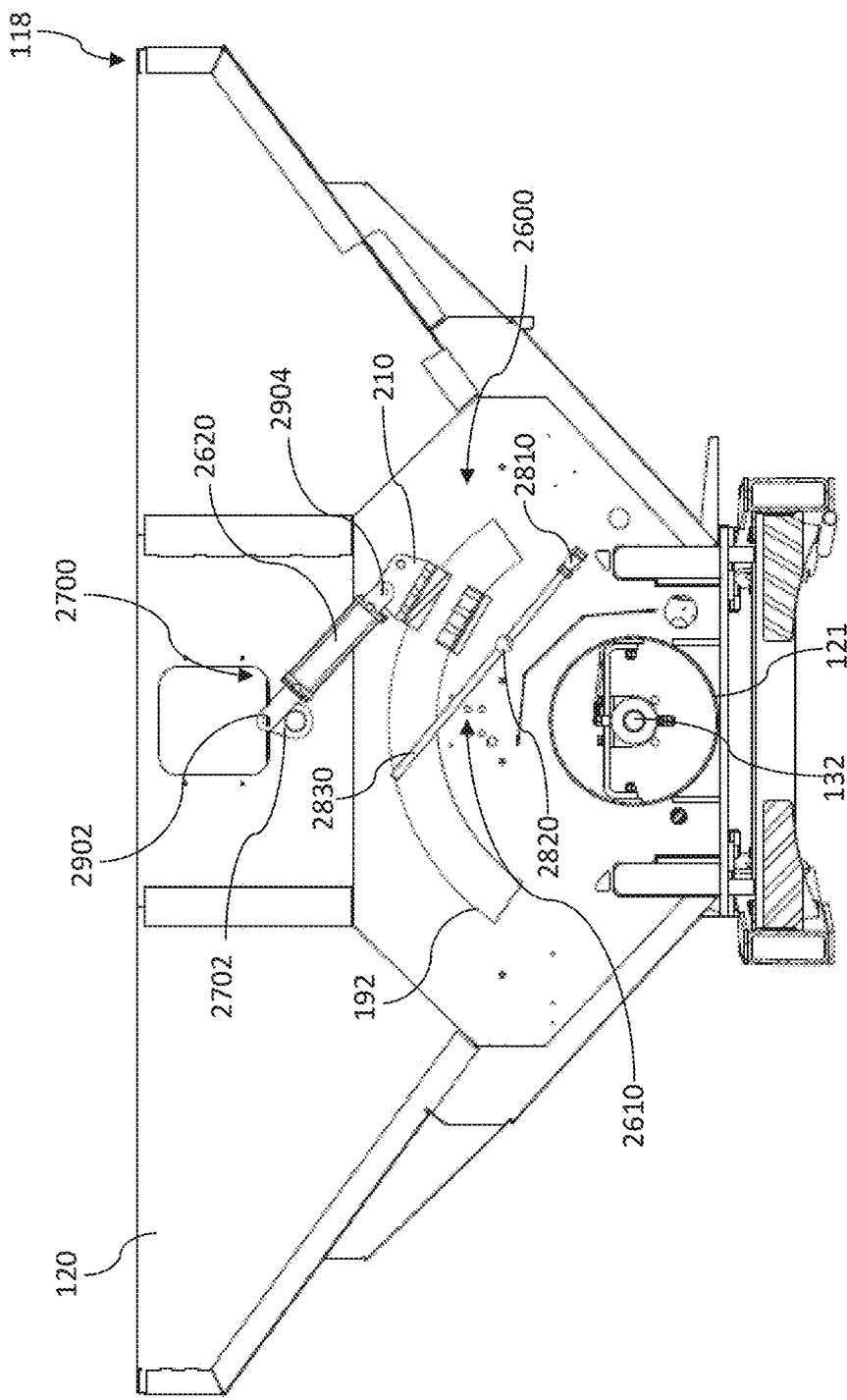
FIG. 29 is a front cross-sectional view of a grain cart having a dual auger assembly with a vertical auger assembly set at a first operating position and a slide assembly having first and second actuators taken along line A in FIG. 26 according to an exemplary embodiment.
Figure 30:
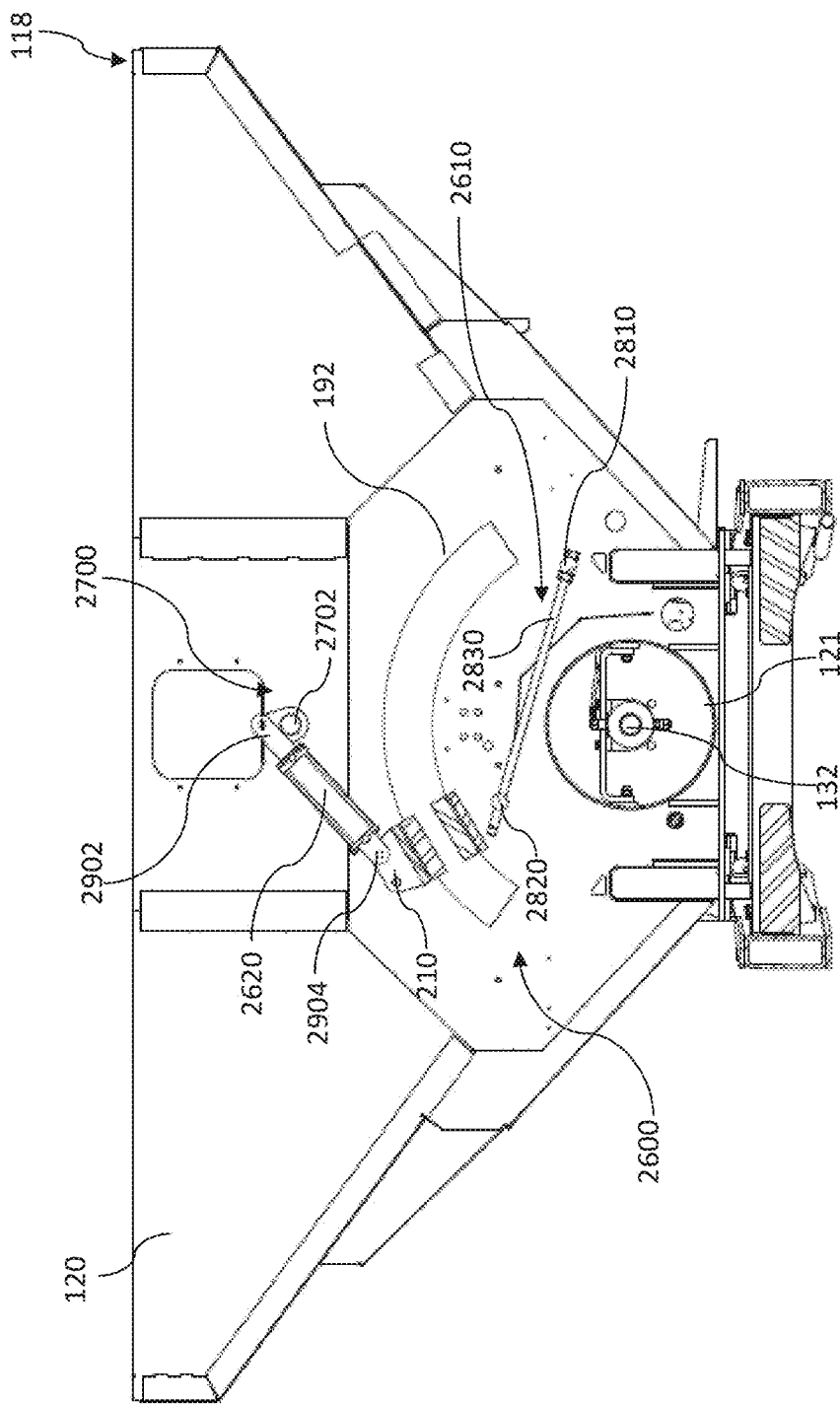
FIG. 30 is a front cross-sectional view of a grain cart having a dual auger assembly with a vertical auger assembly set at a second operating position and a slide assembly having first and second actuators taken along line A in FIG. 26 according to an exemplary embodiment.

The lug assembly 2700 shown in FIGS. 27, 29, and 30 may include the same or similar components of the lug assembly 600 shown in FIGS. 6-12, except that the lug assembly 600 may include: a central upper lug 2702 disposed about a central position along the front wall 120 and above the slide rail 192. In some embodiments, the central upper lug 2702 may be comprised of a cylindrical-shaped projection and a mounting head disposed at the end of the projection, and the mounting head includes a hole to receive a fastener.

Figure 28:
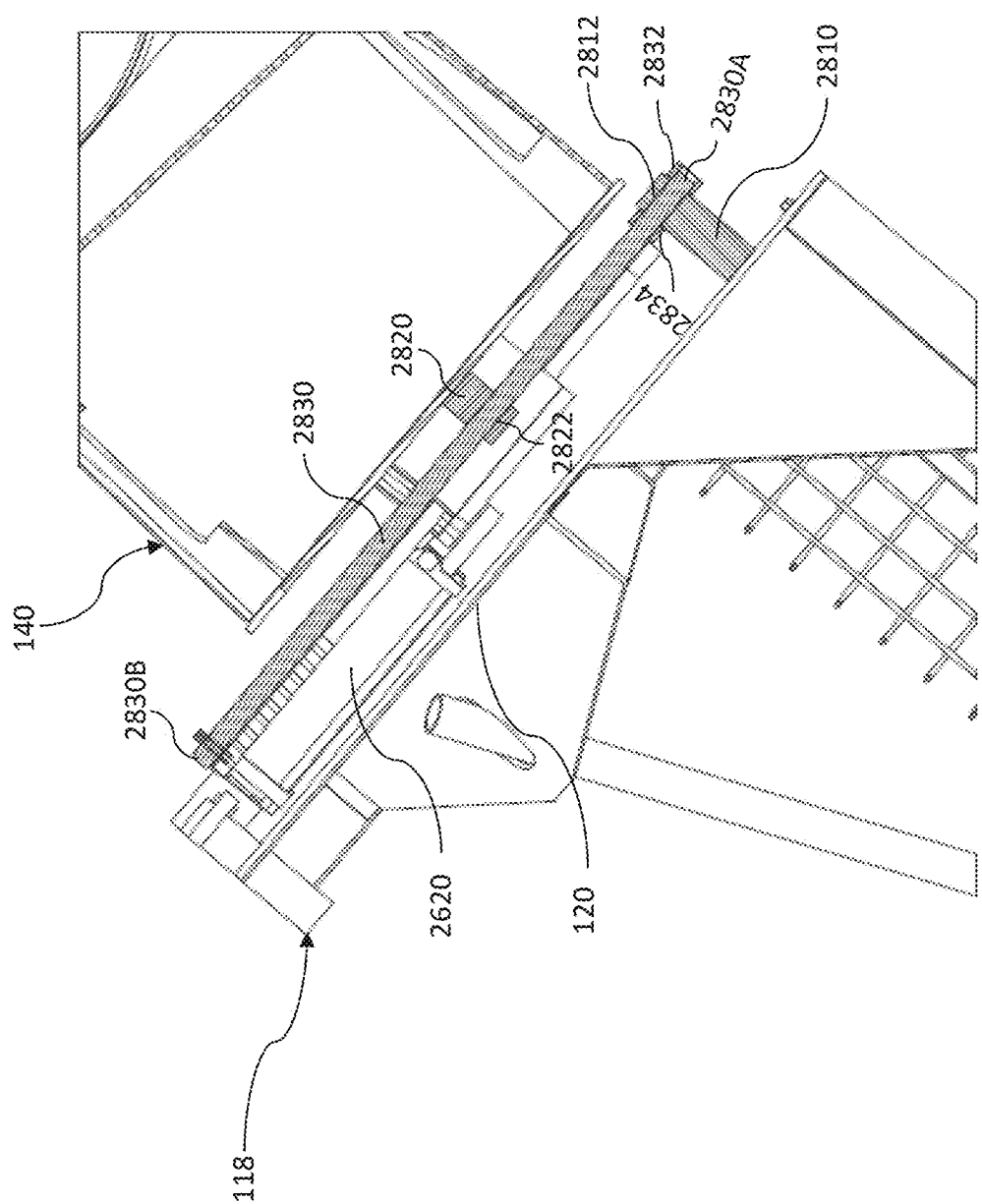
FIG. 28 is a side cross-sectional view of the slide assembly having a first slide actuator and a second slide actuator taken along line B in FIG. 27 according to an exemplary embodiment.

Referring to FIG. 28, the first slide actuator 2610 may include a first support knob 2810 rotatably connected to the front wall 120, a second support knob 2820 rotatably connected to the vertical auger assembly 140, and a slide shaft 2830 extending through both the first and second support knobs 2810 and 2820. In some embodiments, the slide shaft 2830 includes threading (not shown) disposed along the outer surface of the slide shaft 2830. The slide shaft 2830 is configured to rotate about a longitudinal axis of the slide shaft 2830 to move the vertical auger assembly 140 between the first and second operating positions or one or more idle operating positions disposed along the non-unloading range 540.

In some embodiments, the first support knob 2810 has a first cross-hole 2812 formed through the first support knob 2810 and extending transverse to a longitudinal axis of the first support knob 2810. The first cross-hole 2812 is configured to receive the slide shaft 2830 and configured to provide a slip joint connection with the slide shaft 2830. The first support knob 2810 is configured to rotate about the longitudinal axis of the first support knob 2810 to allow the slide shaft 2830 to move the vertical auger assembly 140.

In some embodiments, the second support knob 2820 has a second cross-hole 2822 formed through the second support knob 2820 and extending transverse to a longitudinal axis of the second support knob 2820. The second cross-hole 2822 is configured to receive the slide shaft 2830. The second cross-hole 2822 may include threading (not shown) configured to rotatably engage with the threading of the slide shaft 2830, such that the rotation of slide shaft 2830 translates to linear movement of the second support knob 2820 in axial direction along the slide shaft 2830. The second support knob 2820 is configured to rotate about the longitudinal axis of the second support knob 2820.

In some embodiments, the slide shaft 2830 includes a drive head 2832 (e.g., fixed hex head) disposed at a first end 2830A of the slide shaft 2830 to be coupled to a rotary source (e.g., pneumatic tool) for rotating the slide shaft 2830. As shown in FIG. 28, the first support knob 2810 is received around the slide shaft 2830 via the first cross-hole 2812 proximate to the drive had 2832. The slide shaft 2830 may include a locking member 2834 (e.g., a hex nut) received around the slide shaft 2830 and disposed adjacent to the first support knob 2810 opposite to the drive head 2832. The locking member 2834 is configured to maintain the first support knob 2810 at about the same position along the slide shaft 2830 in the axial direction, as the slide shaft 2830 rotates about its longitudinal axis.

In operation, rotation of the slide shaft 2830 translate to rotational movement of the first and second support knobs 2810 and 2820, whereby the first and second support knobs 2810 and 2820 rotate about their respective longitudinal axes. Due to the slip joint connection between the first support knob 2810 and the slide shaft 2830, the first support knob 2810 remains substantially fixed at the same position along the slide shaft 2830, as the slide shaft 2830 rotates about its longitudinal axis. As shown in FIGS. 29-30, the rotational movement of the first support knob 2810 translates to pivoting movement of the slide shaft 2830, such that a second end 2830B of the slide shaft 2830 pivots about a plane parallel to the front wall 120. Due to the threaded connection between the second support knob 2820 and the slide shaft 2830, the rotational movement of the slide shaft 2830 translates to linear movement of the second support knob 2820 in an axial direction along the slide shaft 2830, such that the second support knob 2820 either moves further away or closer to the first support knob 2810. The combination of the linear movement of the second support knob 2820 and pivoting movement of the slide shaft 2830 forces the vertical auger assembly 140 to pivot along the slide rail 192 between the first and second operating positions.

The second slide actuator 2620 may be removably coupled to rail follower 210 and the central upper lug 2702. For example, referring to FIGS. 29 and 30, the slide actuator 2620 may be a hydraulic cylinder actuator and may include a first end 2902 that may be removably coupled to the central upper lug 2702 and a second end 2904 that may be removably coupled to the rail follower 210. In some embodiments, the first end 2902 is an end of the hydraulic cylinder, and the second end 2904 is the end of a piston rod received in the hydraulic cylinder and configured to extend or retract out of the cylinder. The second end 2904 of the second slide actuator 2620 may be detached from the rail follower 210, as the first slide actuator 2610 moves the vertical auger assembly 140 from a first operating position along the first unloading range 520 to a second operating position along the second unloading range 530. As the vertical auger assembly 140 moves between the first and second operating positions, the second slide actuator 2620 may pivot about the central upper lug 2702 such that the second end 2904 rotates above the central upper lug 2702 pivoting between opposite sides of the hopper 118. When coupled to the central upper lug 2702 and the rail follower 210, the second slide actuator 2620 is configured to move the vertical auger assembly 140 to the one or more operating positions along either the first unloading range 520 or the second unloading range 530 by expanding or contracting the second end 2904.

Figure 31:
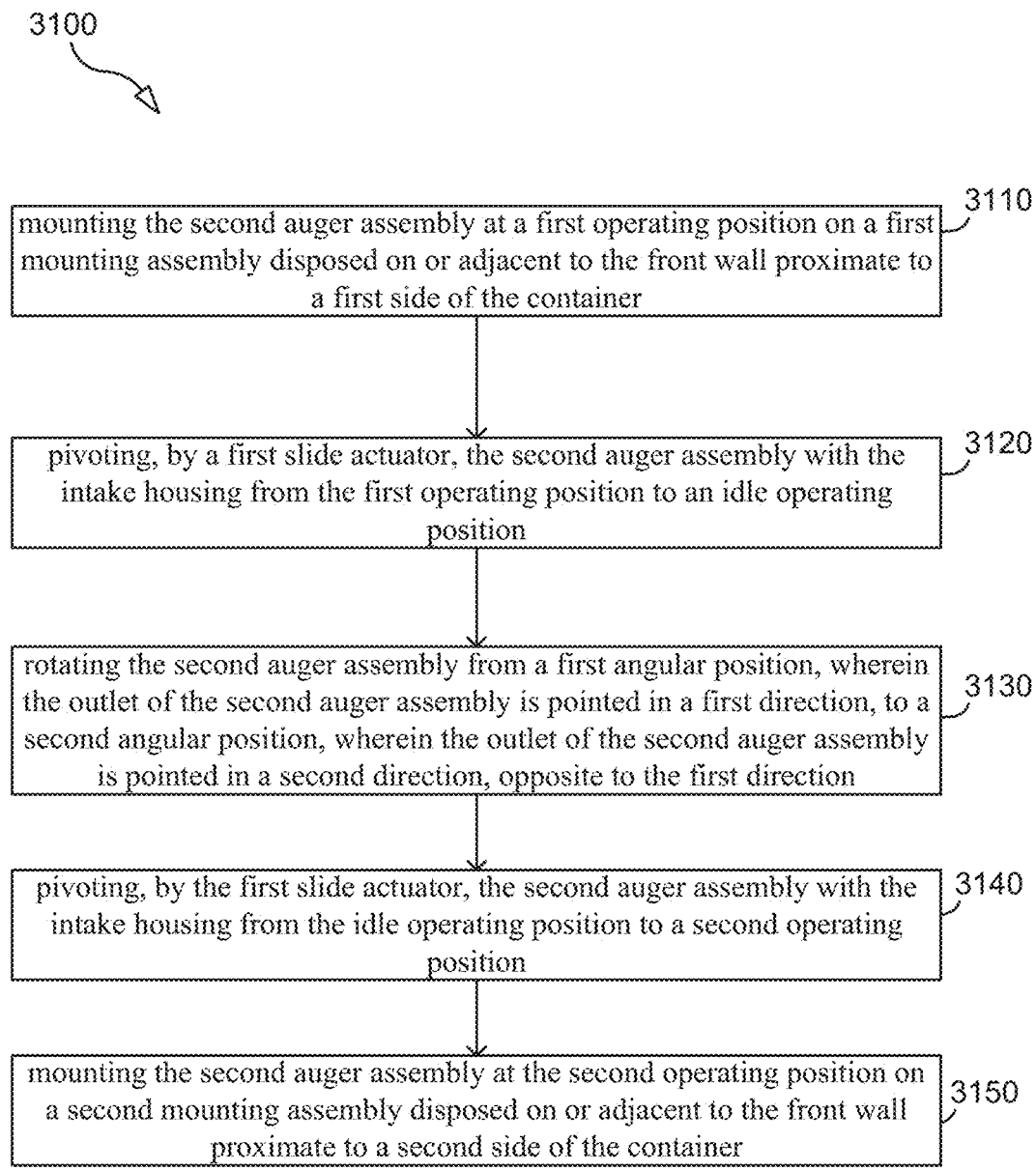
FIG. 31 is a flow chart showing a method of operating a grain cart according to an exemplary embodiment.

FIG. 31 illustrates a method 3100 for operating a grain cart 100 according to the various embodiments of the present disclosure.

In some embodiments, method 3100 may comprise a step 3110 of mounting the vertical auger assembly 140 at a first operating position (e.g., the first higher operating position) on the first mounting assembly 195 disposed on or adjacent to the front wall 120 proximate to the first side of the hopper 118. In some embodiments, at the first operating position, the vertical auger assembly 140 is disposed within the first unloading range 520 and is configured to discharge agricultural material at about the first side of the hopper 118. In some embodiments, the step 3110 of mounting includes inserting a locking member through the rail follower 210 and the slide rail 192, 1312 to prevent the vertical auger assembly 140 from pivoting along slide rail 192, 1312.

In some embodiments, the method 3100 may comprise a step 3120 of pivoting, by the slide actuator 194 or the first slide actuator 1202 or 2610, the vertical auger assembly 140 with the intake housing 142 from the first operating position to an idle operating position. In some embodiments, at the idle operating position, the vertical auger assembly 140 is disposed within the non-unloading range 540 and is not configured to discharge agricultural material. In some embodiments, at the idle operating position, the vertical auger assembly 140 is disposed substantially upright with respect to the ground.

In some embodiments, method 3100 may comprise a step 3130 of rotating the vertical auger assembly 140 from the first angular position, wherein the discharge portion 146 of the vertical auger assembly 140 is pointed in the first direction, to a second angular position, wherein the discharge portion 146 of the vertical auger assembly 140 is pointed in the second direction, opposite to the first direction.

In some embodiments, the method 3100 may comprise a step 3140 of pivoting, by the slide actuator 194 or the first slide actuator 1202 or 2610, the vertical auger assembly 140 with the intake housing 142 from the idle operating position to a second operating position (e.g., the second higher operating position). At the second operating position, the vertical auger assembly 140 is disposed within the second unloading range 530 and is configured to discharge agricultural material at about the second side of the hopper 118.

In some embodiments, the method 3100 may comprise a step 3150 of mounting the vertical auger assembly 140 at the second operating position on the second mounting assembly 196 disposed on or adjacent to the front wall 120 proximate to the second side of the hopper 118. In some embodiments, the step 3150 of mounting includes inserting a locking member through the rail follower 210 and the slide rail 192, 1312 to prevent the vertical auger assembly 140 from pivoting along slide rail 192, 1312.

In some embodiments, the method 3100 may comprise before step 3110, a step of pivoting, by the slide actuator 194 or the second slide actuator 1204 or 2620, the vertical auger assembly 140 from the first lower operating position disposed along the first unloading range 520 to the first operating position disposed along the first unloading range 520, whereby the first operating position corresponds to the highest position of the vertical auger assembly 140 along the first unloading range 520. In some embodiments, the method 3100 may comprise after step 3150, a step of pivoting, by the slide actuator 194 or the second slide actuator 1204 or 2620, the vertical auger assembly 140 from the second operating position disposed along the second unloading range 530 to the second lower operating position disposed along the second unloading range 530, whereby the second operating position corresponds to the highest position of the vertical auger assembly 140 along the second unloading range 530.

In some embodiments, the method may comprise, after step 3120 and before step 3130, a step of removing one or more auger housing fasteners 232 from the flange 230 of the lower auger housing 151 and the outlet 144A of the intake housing 142 so that the vertical auger assembly 140 is free to rotate on the outlet 144A of the intake housing 142. In some embodiments, the method may comprise, after step 3130 and before step 3140, a step of inserting the one or more auger housing fasteners 232 through the flange 230 of the lower auger housing 151 and the outlet 144A of the intake housing 142 to secure the vertical auger assembly 140 at the second angular position.

In some embodiments, the vertical auger assembly 140 is locked at the first angular position while pivoting from the first operating position to the idle operating position. In some embodiments, the vertical auger assembly 140 is locked at the second angular position while pivoting from the idle operating position to the second operating position.

In some embodiments, the method may comprise, after step 3120 and before step 3330, a step of mounting the vertical auger assembly 140 to the front wall 120. In some embodiments, such as the embodiment shown in FIGS. 1-11, the step of mounting the vertical auger assembly 140 to the front wall 120 includes inserting a locking member through the rail follower 210 and the slide rail 192. In some embodiments, such as the embodiment shown in FIGS. 13-25, the step of mounting the vertical auger assembly 140 to the front wall 120 includes inserting a locking member through the rail follower 210 and into the central upper lug 1426.

In some embodiments, such as the embodiment shown in FIGS. 1-11, the method 3100 may comprise before step 3110, a step of attaching the slide actuator 194 to the first lower lug 602 and the first side 611 of the rail follower 210 and a step of pivoting, by the slide actuator 194, the vertical auger assembly 140 from the first lower operating position disposed along the first unloading range 520 to the first operating positon, wherein the first operating position is the first higher operating position disposed along the first unloading range 520.

In some embodiments, such as the embodiment shown in FIGS. 1-11, the method 3100 may further comprise, after step 3110 and before step 3120, a step of detaching the slide actuator 194 from the first lower lug 602 and coupling the slide actuator 194 to the first upper lug 604.

In some embodiments, such as the embodiment shown in FIGS. 1-11, the method 3100 may further comprise, after step 3130 and before step 3140, a step of detaching the slide actuator 194 from the first side 611 of the rail follower 210 and the first upper lug 604 and coupling the slide actuator 194 to the second side 612 of the rail follower 210 and the second upper lug 608.

In some embodiments, such as the embodiment shown in FIGS. 1-11, the method 3100 may comprise, after step 3150, a step of detaching the slide actuator 194 from the second upper lug 608 and attaching the slide actuator 194 to the second lower lug 606 and a step of pivoting, by the slide actuator 194, the vertical auger assembly 140 from the second operating position to the second lower operating position disposed along the second unloading range 530, wherein the second operating position is the second higher operating position disposed along the second unloading range 530.

In some embodiments, such as the embodiment shown in FIGS. 1-11, the method 3100 may comprise, after step 3110 and before step 3120, a step of removing locking member from the rail follower 210 and the slide rail 192, such that the vertical auger assembly 140 is unlocked from the slide rail 192.

In some embodiments, such as the embodiment shown in FIGS. 13-25, the method 3100 may comprise before step 3110, a step of attaching the slide actuator 194 to the second upper lug 602 and the second side 612 of the rail follower 210 and a step of pivoting, by the slide actuator 194, the vertical auger assembly 140 from the first lower operating position disposed along the first unloading range 520 to the first operating positon, wherein the first operating position is the first higher operating position.

In some embodiments, such as the embodiment shown in FIGS. 13-25, the method 3100 may further comprise, after step 3110 and before step 3120, a step of detaching the slide actuator 194 from the second upper lug 608 and the second side 612 of the rail follower 210 and coupling the slide actuator 194 to the first side 611 of the rail follower 210 and the first lower lug 602.

In some embodiments, such as the embodiment shown in FIGS. 13-25, the method 3100 may further comprise, after step 3130 and before step 3140, a step of detaching the slide actuator 194 from the first side 611 of the rail follower 210 and the first lower lug 602 and coupling the slide actuator 194 to the second side 612 of the rail follower 210 and the second lower lug 606.

In some embodiments, such as the embodiment shown in FIGS. 13-25, the method 3100 may comprise, after step 3150, a step of detaching the slide actuator 194 from the second side 612 of the rail follower 210 and the second lower lug 606 and attaching the slide actuator 194 to the first side 611 of the rail follower 210 and the first upper lug 604 and a step of pivoting, by the slide actuator 194, the vertical auger assembly 140 from the second operating position to the second lower operating position disposed along the second unloading range 530, wherein the second operating position is the second higher operating position disposed along the second unloading range 530.

In some embodiments, such as the embodiment shown in FIGS. 13-25, the method 3100 may comprise, after step 3110 and before step 3120, a step of detaching the slide rail 1312 from the first mounting assembly 195, such that the slide rail 1312 is removed from the first mounting position. In some embodiments, such as the embodiment shown in FIGS. 13-25, the method 3100 may comprise, after step 3130 and before step 3140, a step of attaching the slide rail 1312 on the second mounting assembly 196, such that the slide rail 1312 is mounted along the front wall 120 at the second mounting position.

In some other non-limiting embodiments, the method 3100 may comprise, before step 3120 or after step 3140, the step 3130 of rotating the vertical auger assembly 140 from the first angular position to the second angular position.

Dual auger grain carts are described in in U.S. Patent Publication No. 2017/0290270, entitled "Dual Auger Grain Cart with adjustable forward reach", the content of which are herein incorporated in their entirety. The disclosures therein related to dual auger grain carts, and specifically to horizontal and vertical augers, are applicable to grain carts of embodiments herein described.

Track propulsion systems for grain carts are described in U.S. Pat. No. 9,457,854, entitled "Track Assembly for Farm Implement," the contents of which are herein incorporated in their entirety. The disclosures therein related to propulsion systems, are applicable to grain carts of embodiments herein described.

Folding augers for grain carts are described in U.S. Pat. No. 9,216,681, entitled "Grain Cart with Folding Auger," the contents of which are herein incorporated in their entirety. The disclosures therein related to folding augers, are applicable to grain carts of embodiments herein described.

Controls for automating unloading of a farm implement are described in U.S. Pat. No. 9,185,845, entitled "Method for controlling unload of a mobile farm implement"; U.S. Pat. No. 9,596,805, entitled "Method for controlling unload of a mobile farm implement"; and U.S. Pat. No. 10,028,434, entitled "Method for controlling upload of a mobile farm implement." The contents of these applications are herein incorporated in their entirety. The disclosures therein related to the control devices and automated control of farm implements, are applicable to the grain carts of embodiments herein described.

While the subject matter of this disclosure has been described and shown in considerable detail with reference to certain illustrative embodiments, including various combinations and sub-combinations of features, those skilled in the art will readily appreciate other embodiments and variations and modifications thereof as encompassed within the scope of the present disclosure. Moreover, the descriptions of such embodiments, combinations, and sub-combinations is not intended to convey that the claimed subject matter requires features or combinations of features other than those expressly recited in the claims. Accordingly, the scope of this disclosure is intended to include all modifications and variations encompassed within the spirit and scope of the following appended claims.

The invention claimed is:

1. A farm implement comprising:
   a frame;
   a container mounted on the frame and configured to hold agricultural material, the container comprising a plurality of walls defining a container opening to receive agricultural material, and the plurality of walls include a front wall comprising a discharge opening to discharge agricultural material out of the container;
   a first auger assembly disposed in the container and comprises a first auger shaft configured to rotate about a longitudinal axis thereof to move agricultural material received from the container opening toward the discharge opening, wherein the first auger shaft comprises a first helical flighting disposed along the first auger shaft;
   an intake housing rotatably connected to the front wall proximate to the discharge opening, the intake housing comprising an inlet in communication with the discharge opening to receive agricultural material conveyed from the first auger assembly and an outlet to discharge agricultural material out of the intake housing;
   a second auger assembly coupled to the outlet of the intake housing such that the second auger assembly is configured to pivot with the intake housing to one or more operating positions to discharge agricultural material, the second auger assembly comprises an inlet at a first end to receive agricultural material from the outlet of the intake housing, an outlet at a second end to discharge agricultural material, and a second auger shaft configured to rotate about a longitudinal axis thereof to move agricultural material received from the inlet of the second auger assembly toward the outlet of the second auger assembly, wherein the second auger shaft comprises a second helical flighting disposed along the second auger shaft; and
   a first mounting assembly disposed on or adjacent to the front wall proximate to a first side of the container and a second mounting assembly disposed on or adjacent to the front wall proximate to a second side of the container opposite said first side;
   wherein the second auger assembly is mounted on one of the first mounting assembly at a first operating position without the second auger assembly being mounted on the second mounting assembly, or the second auger assembly is mounted on the second mounting assembly at a second operating position without the second auger assembly being mounted on the first mounting assembly;
   wherein the longitudinal axis of the first auger shaft and the longitudinal axis of the second auger shaft are substantially coplanar at the first and second operating positions;
   wherein at the first operating position, the second auger assembly is configured to discharge agricultural material at about the first side of the container; and at the second operating position, the second auger assembly is configured to discharge agricultural material at about the second side of the container, and
   wherein at least a portion of the second helical flighting extends below a centerline of the first auger shaft.

2. The farm implement of claim 1 further comprising:
   a slide rail mounted along the front wall; and
   a rail follower connected to the second auger assembly and received in the slide rail, and the rail follower is configured to slide along the slide rail as the second auger assembly pivots to at least one of the operating positions.

3. The farm implement of claim 2, wherein the slide rail defines a first range of pivoting by the second auger assembly in a plane extending transverse to the frame, and the first range of pivoting defined by the slide rail ranges from about 30° to 150° relative to an axis extending transverse to the longitudinal axis of the first auger shaft.

4. The farm implement of claim 2, wherein the slide rail defines a second range of pivoting by the second auger assembly in a plane extending transverse to the frame, and the second range of pivoting defined by the slide rail ranges from about 30° to 70° relative to an axis extending transverse to the longitudinal axis of the first auger shaft.

5. The farm implement of claim 2, wherein the slide rail is mounted on both the first mounting assembly and the second mounting assembly at a single mounting position.

6. The farm implement of claim 2, wherein the slide rail is mounted on one of: (i) the first mounting assembly at a first mounting position, without the slide rail being mounted on the second mounting assembly, or (ii) the second mounting assembly at a second mounting position, without the slide rail being mounted on the first mounting assembly, wherein the slide rail is moveable between the first and second mounting positions.

7. The farm implement of claim 2 further comprising:
   a lug assembly comprising a plurality of lugs connected to the container;
   a slide actuator removably coupled to the rail follower and at least one of the plurality of lugs, and the slide actuator is configured to move the second auger assembly to the one or more operating positions.

8. The farm implement of claim 7, wherein the plurality of lugs comprises a first lug, and the slide actuator is removably coupled to the first lug;
   wherein the slide actuator is coupled to the first lug, the slide actuator is configured to move the second auger assembly between the first operating position and an idle operation position; and
   wherein at the idle operation position, the second auger assembly is not configured to discharge agricultural material from the container.

9. The farm implement of claim 7, wherein the plurality of lugs comprises a second lug, and the slide actuator is removably coupled to the second lug;
   wherein the slide actuator is coupled to the second lug, the slide actuator is configured to move the second auger assembly between the second operating position and an idle operation position; and wherein at the idle operation position, the second auger assembly is not configured to discharge agricultural material from the container.

10. The farm implement of claim 7, wherein the plurality of lugs comprises a third lug, and the slide actuator is removably coupled to the third lug;
wherein the slide actuator is coupled to the third lug, the slide actuator is configured to move the second auger assembly between one or more operating positions along a first unloading range;
wherein at the one or more operating positions along the first unloading range, the vertical auger assembly is configured to discharge agricultural material about the first side of the container.

11. The farm implement of claim 7, wherein the plurality of lugs comprises a fourth lug, and the slide actuator is removably coupled to the fourth lug;
wherein the slide actuator is coupled to the fourth lug, the slide actuator is configured to move the second auger assembly between one or more operating positions along a second unloading range;
wherein at the one or more operating positions along the second unloading range, the vertical auger assembly is configured to discharge agricultural material about the second side of the container.

12. The farm implement of claim 7, wherein the plurality of lugs comprises a second set of lugs disposed proximate to the first side of the container, and
wherein the slide actuator is coupled to the second set of lugs, the slide actuator is configured to move the second auger assembly from the first operating position to a second operation position disposed on the second side of the container.

13. The farm implement of claim 2, further comprising a locking member configured to be inserted through the rail follower and into the first or second mounting assemblies to selectively lock the second auger assembly at the one or more operating positions.

14. The farm implement of claim 1, wherein the second auger assembly comprises a lower auger section comprising a lower auger housing removably coupled to the outlet of the intake housing, the second auger shaft disposed in the lower auger housing.

15. The farm implement of claim 14, wherein the lower auger housing comprises a flange projecting in a radial direction from a first end of the lower auger housing and rotatably received on the outlet of the intake housing such that the lower auger housing is configured to rotate about the longitudinal axis thereof between one or more angular positions.

16. The farm implement of claim 15, wherein the second auger assembly comprises one or more auger housing fasteners, each auger housing fastener is configured to be inserted through the flange of the lower auger housing and the outlet of the intake housing to lock the lower auger housing at a respective angular position.

17. The farm implement of claim 15, wherein the one or more angular positions include a first angular position, wherein the outlet of the second auger assembly faces away from the first side of the container, and a second angular position, wherein the outlet of the second auger assembly faces away from the second side of the container.

18. The farm implement of claim 14 further comprising a drive assembly disposed at least partly in the intake housing and operatively connected to the first auger assembly and the second auger assembly such that the drive assembly is configured to transmit torque to the horizontal auger shaft of the first auger assembly and the lower auger shaft of the second auger assembly.

19. The farm implement of claim 14, wherein the second auger assembly further comprises:
an upper auger section comprising an upper auger housing removably coupled to a second end of the lower auger housing, a third auger shaft configured to rotate about a longitudinal axis thereof, and a third helical flighting disposed along the third auger shaft,
an auger shaft joint operatively connecting the second and third auger shafts such that the auger shaft joint is configured to transmit torque applied by the second auger shaft to the third auger shaft, and
a folding joint assembly defining a pivot axis about which the upper auger section is pivotable relative to the lower auger section, and the folding joint assembly is configured to pivot the upper auger section between a joint operating position wherein the second and third auger shafts are operatively connected via the auger shaft joint to permit agricultural material to be discharged from the container and a transport position wherein the upper auger section extends along the front wall of the container to facilitate transporting the farm implement.

20. A farm implement comprising:
a frame;
a container mounted on the frame and configured to hold agricultural material, the container comprising a plurality of walls defining a container opening to receive agricultural material, and the plurality of walls include a front wall comprising a discharge opening to discharge agricultural material out of the container;
a first auger assembly disposed in the container and operable to move agricultural material received from the container opening toward the discharge opening;
an intake housing rotatably connected to the front wall proximate the discharge opening, the intake housing comprising an inlet in communication with the discharge opening to receive agricultural material conveyed from the first auger assembly and an outlet to discharge agricultural material out of the intake housing;
a second auger assembly coupled to the outlet of the intake housing such that the second auger assembly is configured to pivot with the intake housing between one or more operating positions along a first unloading range and a second unloading range to discharge agricultural material, and the second auger assembly comprises an inlet at a first end to receive agricultural material from the outlet of the intake housing and an outlet at a second end to discharge agricultural material;
a slide rail mounted to the front wall of the container; and
a rail follower connected to the intake housing and received in the slide rail, and the rail follower is configured to slide along the slide rail as the second auger assembly pivots to at least one of the operating positions;
wherein the second auger assembly is set at the one or more operating positions along the first unloading range, the second auger assembly is configured to discharge agricultural material at about a first side of the container, and wherein the second auger assembly is set at the one or more operating positions along the second unloading range, the second auger assembly is configured to discharge agricultural material at about a second side of the container, wherein the first auger assembly comprises a horizontal auger section comprising a horizontal auger shaft configured to rotate about a longitudinal axis of the horizontal auger section and a horizontal helical flighting disposed along the horizontal auger shaft;

wherein the second auger assembly comprises a lower auger section comprising a lower auger housing removably coupled to the outlet of the intake housing, a lower auger shaft configured to rotate about a longitudinal axis of the lower auger housing, and a lower helical flighting disposed along the lower auger shaft; and wherein at least a portion of the lower helical flighting extends below a centerline of the horizontal auger shaft.

21. The farm implement of claim 20, wherein the front wall comprises an inclined portion and an upright portion, and the slide rail is mounted to the inclined portion of the front wall.

22. The farm implement of claim 20, further comprising: a slide actuator coupled to the rail follower and the container, and the slide actuator is configured to move the second auger assembly to the one or more operating positions.

23. The farm implement of claim 22, wherein the rail follower includes a first side and a second side, and the slide actuator is removably coupled to one of the first side and second side of the rail follower.

24. The farm implement of claim 23, wherein the slide actuator is coupled to the first side of the rail follower, the slide actuator is configured to move the second auger assembly to at least one operating position disposed along the first unloading range;

wherein the slide actuator is coupled to the second side of the rail follower, the slide actuator is configured to move the second auger assembly to at least one operating position disposed along the second unloading range.

25. The farm implement of claim 20, wherein the intake housing comprises a back wall facing the front wall of the container, and the inlet of the intake housing is disposed along the back wall; and wherein the rail follower comprises a plate extending from the back wall of the intake housing and a bracket projected from the handle and received on the slide rail.

26. The farm implement of claim 20, wherein the second auger assembly is rotatably received on the outlet of the intake housing such that the second auger assembly is configured to rotate about a longitudinal axis thereof between one or more angular positions.

27. The farm implement of claim 26, wherein the one or more angular positions include a first angular position, wherein the outlet of the second auger assembly faces away from the first side of the container, and a second angular position, wherein the outlet of the second auger assembly faces away from the second side of the container.

28. The farm implement of claim 20, wherein a center line of the horizontal auger shaft and a center line of the lower auger shaft are substantially coplanar along a common plane.

29. The farm implement of claim 28, wherein the intake housing is substantially symmetrical about the common plane.

30. The farm implement of claim 28, further comprising a drive assembly disposed at least partly in the intake housing and operatively connected to the first auger assembly and the second auger assembly such that the drive assembly is configured to transmit torque to the horizontal auger shaft of the first auger assembly and the lower auger shaft of the second auger assembly.

31. The farm implement of claim 20, wherein the second auger assembly further comprises:

an upper auger section comprising an upper auger housing removably coupled to a second end of the lower auger housing, an upper auger shaft configured to rotate about a longitudinal axis of the upper auger housing, and an upper helical flighting disposed along the upper auger shaft, an auger shaft joint operatively connecting the lower and upper auger shafts such that the auger shaft joint is configured to transmit torque applied by the lower auger shaft to the upper auger shaft, and a folding joint assembly defining a pivot axis about which the upper auger section is pivotable relative to the lower auger section, and the folding joint assembly is configured to pivot the upper auger section between an operating position wherein the lower and upper auger shafts are operatively connected via the auger shaft joint to permit agricultural material to be discharged from the container and a transport position wherein the upper auger section extends along the front wall of the container to facilitate transporting the farm implement.

* * * * *

UNITED STATES PATENT AND TRADEMARK OFFICE
CERTIFICATE OF CORRECTION

| | | |
|---|---|---|
| PATENT NO. | : 11,641,805 B2 | Page 1 of 1 |
| APPLICATION NO. | : 17/236072 | |
| DATED | : May 9, 2023 | |
| INVENTOR(S) | : Ronald J. Schlimgen et al. | |

It is certified that error appears in the above-identified patent and that said Letters Patent is hereby corrected as shown below:

In the Specification

Column 2, Lines 3-6: delete "According to a first aspect, embodiments of a farm implement are provided. In some embodiments, the farm implement may include [TO BE DETERMINED AFTER CLAIMS FINALIZED]"

Signed and Sealed this
Third Day of June, 2025

Coke Morgan Stewart
*Acting Director of the United States Patent and Trademark Office*